(12) United States Patent
Mikan et al.

(10) Patent No.: US 9,544,428 B2
(45) Date of Patent: *Jan. 10, 2017

(54) DATA EXTRACTION FROM A CALL

(71) Applicant: AT&T MOBILITY II LLC, Atlanta, GA (US)

(72) Inventors: Jeffrey Mikan, Atlanta, GA (US); Justin McNamara, Atlanta, GA (US); John Lewis, Lawrenceville, GA (US); Fulvio Arturo Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,632

(22) Filed: Mar. 30, 2016

(65) Prior Publication Data

US 2016/0212261 A1    Jul. 21, 2016

Related U.S. Application Data

(63) Continuation of application No. 14/712,420, filed on May 14, 2015, now Pat. No. 9,338,288, which is a (Continued)

(51) Int. Cl.
*H04M 3/42* (2006.01)
*H04M 1/656* (2006.01)
(Continued)

(52) U.S. Cl.
CPC ......... *H04M 3/42221* (2013.01); *H04M 1/656* (2013.01); *H04M 3/42042* (2013.01);
(Continued)

(58) Field of Classification Search
CPC   H04M 3/4221; H04M 3/42042; H04M 1/656; H04M 1/72572; H04W 4/16; H04W 4/12
See application file for complete search history.

(56) References Cited

U.S. PATENT DOCUMENTS

| 5,794,249 A | 8/1998 | Orsolini et al. |
| 5,983,187 A | 11/1999 | Haddock |

(Continued)

OTHER PUBLICATIONS

'Part-of-speech tagging', Wikipedia, the free encyclopedia, Retrieved from http://en.wikipedia.org/wiki/Part-of-speech tagging, Downloaded on Aug. 4, 2009, 4 pages.

*Primary Examiner* — Brandon Miller
(74) *Attorney, Agent, or Firm* — Baker & Hostetler LLP

(57) ABSTRACT

A network component comprising a communications portion and a processor portion is disclosed. The communications portion may be configured to detect a signal indicative of a call associated with a mobile device. The processor portion may be configured to detect at least one record cue in the signal. The processor portion may be also be configured to respectively capture at least one portion of the call upon the at least one record cue being detected. The processor portion may also be configured to respectively associate at least one identifier with the at least one captured portion of the call. The identifier may respectively identify the at least one captured portion of the call.

20 Claims, 15 Drawing Sheets

Related U.S. Application Data continuation of application No. 12/431,443, filed on Apr. 28, 2009, now Pat. No. 9,071,949.

(51) Int. Cl.
*H04W 4/16* (2009.01)
*H04W 4/12* (2009.01)
*H04M 1/725* (2006.01)

(52) U.S. Cl.
CPC .......... *H04W 4/16* (2013.01); *H04M 1/72572* (2013.01); *H04W 4/12* (2013.01)

(56) References Cited

U.S. PATENT DOCUMENTS

| | | |
|---|---|---|
| 6,411,683 B1 | 6/2002 | Goldberg et al. |
| 6,483,896 B1 | 11/2002 | Goldberg et al. |
| 6,711,590 B1 | 3/2004 | Lennon |
| 7,155,207 B2 | 12/2006 | Chapman et al. |
| 7,164,934 B2 | 1/2007 | Malizia-Hoyt et al. |
| 7,174,299 B2 | 2/2007 | Fujii et al. |
| 7,457,396 B2 | 11/2008 | Claudatos et al. |
| 7,907,705 B1 | 3/2011 | Huff et al. |
| 7,907,905 B2 * | 3/2011 | Huang ................. G06K 7/0008 340/10.2 |
| 8,295,446 B1 * | 10/2012 | Apple .................... H04M 15/08 379/88.01 |
| 9,071,949 B2 * | 6/2015 | Mikan ................... H04W 1/656 |
| 9,338,288 B2 * | 5/2016 | Mikan ............... H04M 3/42042 |
| 2002/0026289 A1 | 2/2002 | Kuzunuki et al. |
| 2002/0103644 A1 * | 8/2002 | Brocious ................ G10L 15/26 704/246 |
| 2005/0129216 A1 | 6/2005 | Tsujiuchi |
| 2007/0129063 A1 | 6/2007 | Recio et al. |
| 2009/0287646 A1 | 11/2009 | Maciocci |
| 2010/0082241 A1 * | 4/2010 | Trivedi .............. G01C 21/3679 701/532 |

* cited by examiner

DATA EXTRACTION FROM A CALL

CROSS-REFERENCE TO RELATED APPLICATIONS

This application is a continuation of U.S. patent application Ser. No. 14/712,420, entitled DATA EXTRACTION FROM A CALL, filed May 14, 2015, which is a continuation of U.S. patent application Ser. No. 12/431,443, entitled DATA EXTRACTION FROM A CALL, filed Apr. 28, 2009, the contents of which are incorporated by reference herein in their entirety.

BACKGROUND OF THE INVENTION

Wireless communication devices such as cellular telephones (cell phone), other mobile communication devices that are combined with cellular telephones, cellular telephones that are combined with other electronic devices, such as digital cameras, and the like have become prevalent in society. Due to the small form factors of these mobile devices, subscribers and other users may often have the mobile device with them at all times of the day and night. For example, a user may have a cell phone clipped to a belt, in a brief case, purse or a computer bag, for example. Also, it is typical for the cell phone owner (or "user") to use the cell phone for most of the owner's telephonic communications.

Due to this ready availability of cell phones, it is not uncommon for a user to receive calls from certain persons or organizations at a moment when the user is already otherwise occupied. By way of example, and not limitation, the user may be driving a car or engaging in any other activity that prevents the user from taking notes or otherwise memorializing the call. Thus, if the user cannot take notes as necessary during a call, the user may not capture important information such as, but not limited to, a destination address; an order from a customer including quantity, price, unit, etc.; a telephone number; or an individual's business contact information such as a name, a title, a business address, etc.

Thus, mobile device users may benefit from systems and methods that enable information from calls to be automatically memorialized and reported to the user according to the user's predetermined preferences for the various types of information that may be communicated during a call.

SUMMARY OF THE INVENTION

A network component may comprise a communications portion and a processor portion. The communications portion may be configured to detect a call indicative of a call to a mobile device or a call indicative of a call from the mobile device. The processor portion may be configured to detect a first predetermined record cue. The processor portion may be configured to capture at least a first portion of the call upon the first predetermined record cue being detected. The processor portion may be configured to associate a first predetermined identifier with the captured at least first portion of the call. The first predetermined identifier may identify the at least first portion of the call in the captured first portion of the call.

In another embodiment, a network component may comprise a communications portion and a processor portion. The communications portion may be configured to detect a call indicative of a call to a mobile device or a call indicative of a call from the mobile device. The processor portion may be configured to detect a first predetermined record cue. The processor portion may be configured to convert at least a first portion of the call into first data upon the first predetermined record cue being detected and to write the first data into a data file. The processor portion may be configured to associate a first predetermined identifier with the first data. The first predetermined identifier may identify the first data in the data file.

In another embodiment, a method of using a network component may comprise detecting a call indicative of a call to a mobile device or a call indicative of a call from the mobile device. The method may also comprise detecting a first predetermined record cue. The method may also comprise capturing at least a first portion of the call upon the first predetermined record cue being detected. The method may also comprise associating a first predetermined identifier with the captured at least first portion of the call. The first predetermined identifier may identify the at least first portion of the call in the captured first portion of the call.

In another embodiment, a network component may comprise a communications portion and a processor portion. The communications portion may be configured to detect a signal indicative of a call associated with a mobile device. The processor portion may be configured to detect at least one record cue in the signal and respectively capture at least one portion of the call upon detection of the at least one record cue. The processor portion may also be configured to respectively associate at least one identifier with the at least one captured portion of the call. The at least one identifier may respectively identify the at least one captured portion of the call.

In another embodiment, a mobile device may comprise a communications portion and a processor portion. The communications portion may be configured to detect a call to the mobile device or a call from the mobile device. The processor portion may be configured to detect a first predetermined record cue. The processor portion may also be configured to capture at least a first portion of the call upon the first predetermined record cue being detected. The processor portion may also be configured to associate a first predetermined identifier with the captured at least first portion of the call. The first predetermined identifier may identify the at least first portion of the call in the captured at least first portion of the call.

In another embodiment, a mobile device may comprise a communications portion and a processor portion. The communications portion may be configured to detect a signal indicative of a call associated with the mobile device. The processor portion may be configured to detect at least one record cue in the signal and respectively capture at least one portion of the call upon detection of the at least one record cue. The processor portion may be configured to respectively associate at least one identifier with the at least one captured portion of the call. The at least one identifier may respectively identify the at least one captured portion of the call.

In another embodiment, a method of using a mobile device may comprise detecting a call to the mobile device or a call from the mobile device. The method may also comprise detecting a first predetermined record cue. The method may also comprise capturing at least a first portion of the call upon the first predetermined record cue being detected. The method may also comprise associating a first predetermined identifier with the captured at least first portion of the call. The first predetermined identifier may identify the at least first portion of the call in the captured at least first portion of the call.

In another embodiment, a mobile device may comprise a communications portion and a processor portion. The communications portion may be configured to detect a call to the mobile device or a call from the mobile device. The processor portion may be configured to detect a first predetermined record cue. The processor portion may be configured to convert at least a first portion of the call into first data upon the first predetermined record cue being detected and to write the first data into a data file. The processor portion may be configured to associate a first predetermined identifier with the first data. The first predetermined identifier may identify the first data in the data file.

In another embodiment, a method of extracting data from a call may comprise detecting a signal indicative of a call associated with a mobile device and detecting at least one record cue in the signal. The method may also comprise respectively capturing at least one portion of the call upon detection of the at least one record cue. The method may also comprise respectively associating at least one identifier with the at least one captured portion of the call. The at least one identifier may respectively identify the at least one captured portion of the call.

DETAILED DESCRIPTION OF ILLUSTRATIVE EMBODIMENTS

Figure 1:
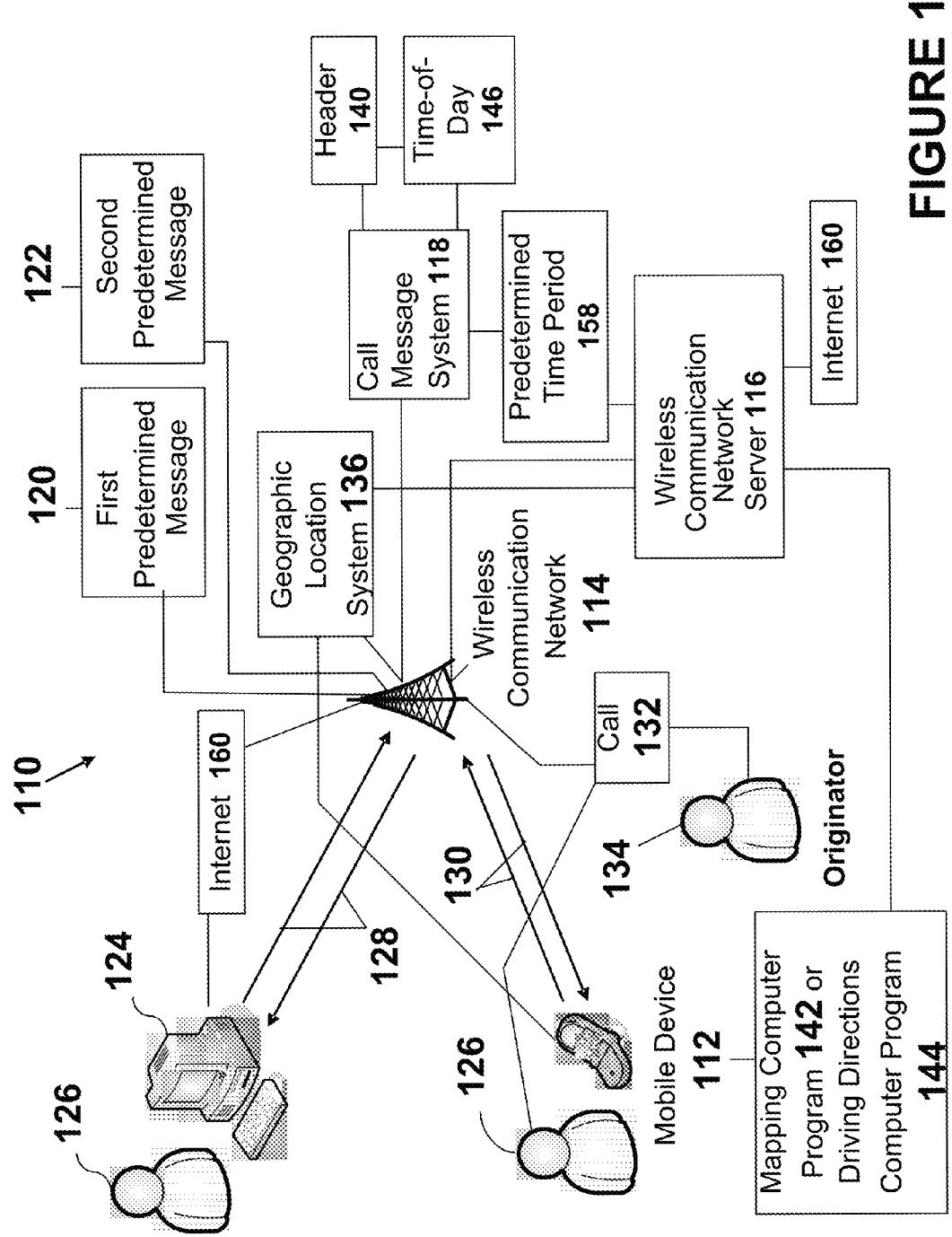
FIG. 1 depicts an overview of an architecture of a wireless communication system in which aspects of an embodiment may be implemented.

FIG. 1 depicts an overview of a wireless communication system 110 in which embodiments may be implemented. The wireless communication system (WCS) 110 may include but is not limited to a mobile device 112, a wireless communication network (WCN) 114, a wireless communication network server (WCNS) 116, a call message system (CMS) 118, a first predetermined message (FPM) 120 and a second predetermined message (SPM) 122. A device user 126, who might also be referred to as a WCS 110 or WCN 114 subscriber or more simply as a user, may interface with the WCN 114 through the mobile device 112 which is in communication with the WCN 114 through wireless communication channel 130. The user 126 may also interface with the WCN 114 via a personal computer 124 that is in communication with the WCN 114 through communication channel 128. Communication channel 128 may include, but is not limited to an Internet 160 based connection, a wireless connection such as radio frequency for example, a telephone based dial-up connection and the like.

An originator 134, or caller, may initiate communication with the user 126 by placing a call 132 to the user 126. The originator 134 may, by way of example and not limitation, initiate such a call from another wireless device, a traditional wired telephone, a telephone switchboard, or a computing device in communication with the WCN 114. The user is also fully capable of placing the call 132 to a recipient (not shown) as well, thus the user 126 can also be an originator of a call 132. The WCNS 116 may detect either the call 132 made from or placed to the mobile device 112. The WCNS 116 may also detect a call 132, or a signal that is indicative of a call 132 placed to or from the mobile device 112. A call 132, or signal indicative of a call 132, may be a signal or some other kind of indication that a call 132 is being placed to or from, or otherwise associated with, the mobile device 132. However, the call 132, or signal indicative of a call 132, may not necessarily be the actual call 132 that is made to or placed from the mobile device 112.

The WCNS 116 may monitor the call 132 that is made to or from the mobile device 112. When the WCNS 116 monitors the call 132, the WCNS may receive and interpret communication made from and to the mobile device 112. The monitored communication may include voice communication of the user 126 and/or the originator 134 (or any other parties to the call 132) and other kinds of communication such as but not limited to the tones, signals, or the like made by the user 126 via the user interface portion 306 of the mobile device 112. The monitored communication may also include tones, signals, or the like, made by the originator 134 or other parties to the call 132.

The WCNS 116 may be in communication with the Internet 160, and accordingly, the user 126 may be in communication with the Internet 160 via mobile device 112, the WCN 114, and the WCNS 116, for example.

The CMS 118 may be implemented as any system that is in communication with the WCN 114 and the WCNS 116. The CMS 118 may include any hardware and/or software necessary for operating and/or controlling the CMS 118. For example, the CMS 118 may include a processor portion that may be individual digital logic components, a processor, a microprocessor, and application-specific integrated circuit (ASIC), and the like. All processors and/or processor portions discussed in this specification may include memory such as random access memory, register memory, cache memory and the like. Memory may include computer executable instructions by which the processor portion may operate. For example, computer executable instructions may include computer executable code that, when executed, operate the relevant actions associated with the processor portion.

The CMS 118 is capable of recording, digitally or otherwise, a message left by a caller after the call is put into communication with the CMS 118. The CMS 118 may receive a call from the WCN 114 or the WCNS 116 after a predetermined time period 158 expires indicating that a call to the mobile device 112 may not be answered, or received, by the user 126. Alternatively, the CMS 118 may also receive a call from the WCN 114 or the WCNS 116 upon a predetermined condition, or the like, being met that requires a transfer of the call to the CMS 118.

In an embodiment, the CMS 118 may be configured to place the call 132 into communication with the FPM 120. Alternatively, the CMS 118 may also be configured to place the call 132 into communication with the SPM 122. There may be any number of predetermined messages with which the CMS 118 may place the call 132 into communication upon receiving the call 132 from the WCN 114, the mobile device 112, or the WCNS 116. The FPM 120 or SPM 122 may inform the originator 134 that the user 126 is not available at the time to engage with the call 132. The FPM 120 or SPM 122 may be a default WCN 114 message or a default CMS 118 message, or may be a message personally recorded by the user 126. A personally recorded FPM 120 or SPM 122 may convey any information the user 126 wishes to communicate to an originator 134 of the call 132. The CMS 118 may be configured to put an originator 134 specific FPM 120 or SPM 122 in communication with the call 132. The FPM 120 or SPM 122 may be part of the CMS 118 or the FPM 120 and the SPM 122 may be stored in the datastore 210 as system data 212. Alternatively, the FPM 120 or SPM 122 may be stored in the memory of the processor portion 204. Also, the FPM 120 or SPM 122 may be implemented in a distinct component of the WCN 114, or the like.

The CMS 118 may be further capable of recording other data regarding the call in a header information section 140, for example. Information recorded in the header 140 may include but not be limited to a call identification, the identity of the originator 134, the time of day 146 that the call 132 was received and the time of the duration of the call 132 (or message). The header 140 may store this information either collectively or individually as attributes, for example.

The mobile device 112 may be one of, but not limited to a cellular telephone, a cellular telephone in combination with another electronic device and a cellular telephone in combination with another wireless communication device. By way of example, and not limitation, cell phones may be combined with electronic devices such as digital cameras and wireless communication devices such as a Blackberry™. The mobile device 112 may include any hardware and/or software necessary for operating and/or controlling the mobile device 112. For example, the mobile device 112 may include a processor portion that may be individual digital logic components, a processor, a microprocessor, and application-specific integrated circuit (ASIC), and the like. Elements of an exemplary mobile device 112 will be discussed infra in regard to FIG. 3.

Figure 2:
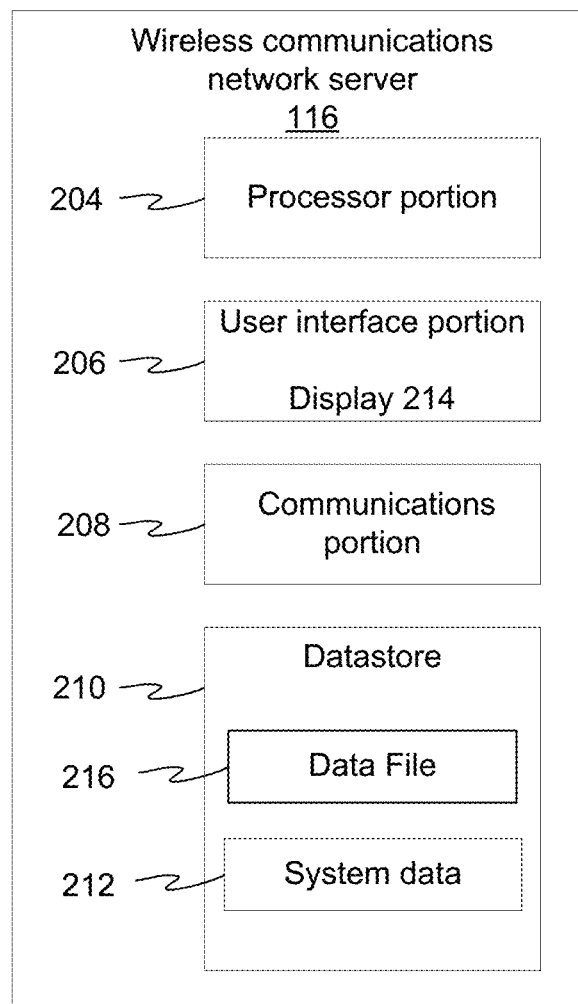
FIG. 2 depicts a block diagram of a wireless communication network server in which aspects of an embodiment may be implemented.

FIG. 2 depicts a block diagram of an example WCNS 116 which may be implemented in embodiments. The WCNS 116 may be implemented as, but is not limited to, a network server, a network controller, a network switch or any component, system and/or subsystem capable of operating as the WCSN 116 is described in any of the embodiments. The WCNS 116 may also be in combination with another component of the WCN 114, such as but not limited to the CMS 118. The WCNS 116 may include a processor portion 204, a user interface portion 206, a communications portion 208, and a datastore portion 210. The datastore portion 210 may have stored thereon system data 212. The elements of the WCNS 116 may also be implemented in one individual component of the WCN 114 or in more than one component of the WCN 114. In other words, the elements of the WCNS 116 may be distributed among one or more components or devices of the WCN 114. Exemplary embodiments of the WCNS 116 will be discussed infra in regard to FIG. 6, FIG. 7, and FIG. 8.

The processor portion 204 may include any hardware and/or software necessary for operating and/or controlling the user interface portion 206, the communications portion 208 and the datastore portion 210. For example, the processor portion 204 may be individual digital logic components, a processor, a microprocessor, and application-specific integrated circuit (ASIC), and the like. The processor portion 204 may include memory such as random access memory, register memory, cache memory and the like. The processor portion 204 may operate the methods provided in FIG. 4 to FIG. 4F.

The processor portion 204 is capable of recording, digitally or otherwise, either the call 132 or portions of the call 132. The processor portion 204 is also capable of converting the recording of the call 132 or the recorded of portions of the call 132 into data that may be stored into one or more data files 216. The processor portion 204 is also capable of directly converting the call 132 or portions of the call 132 into data that may be stored into one or more data files 216. The data file 216 could be any kind of data file or database file capable of receiving data entries and storing the received data entries in an organized and accessible format. The data file 216 may be a text based transcript of the call 132 or an audio file with searchable metadata. The processor portion 204 may, by way of example and not limitation, employ voice recognition software and/or voice file conversion software to convert a recorded call 132 or recorded portions of the call 132 into data or to convert the call 132 or portions of the call 132 directly into data.

A portion of the call 132 may include the entire duration of the call 132. A portion of the call 132 may also include, but is not limited to, a portion of the call 132 determined by a predetermined record time. A portion of the call 132 may also be determined by the detection of a record cue, which may be predetermined, during the call 132 and include the portion of the call 132 from the detected record cue to one of: the end of the call 132; the detection of another record cue; a pause of a predetermined length of time in the conversation during the call 132; or a change in the direction of the voice in the call 132 (e.g., the cessation of the user 126 speaking and the originator 134 (or other party) subsequently beginning to speak, or vice versa).

The processor portion 204 may be in communication with the user interface portion 206, the communications portion 208 and/or the datastore portion 210. The processor portion 204 may control the user interface portion 206. For example, the processing portion 204 may direct the user interface portion 206 to output information visually, electronically and/or audibly, and the processing portion 204 may direct the user interface portion 206 to receive input from the user, perhaps through electronic means. The processing portion 204 may control the communications portion 208. For example, the processing portion 204 may send and/or receive data via the communications portion 208. The processing portion 204 may operate on the datastore 210 to detect events, invoke actions, apply exceptions, and/or receive overrides.

The user interface portion 206 may be, in any combination of hardware and/or software, any component, system and/or subsystem for receiving input from a user and outputting information to the user. The user interface portion 206 may include a display 214 and/or keyboard. The keyboard may be a numerical pad. For example, the user interface portion 206 may include a computer keypad, programmable softkeys, mechanical buttons, touch-screens, and/or the like. The user interface portion 206 may also include an electronic interface that may receive user instructions from the communications portion 208 that are sent from a remote location through the WCN 114, perhaps from the mobile device 112 or the personal computer 124. The display 214 may provide visual output and input, for example via a touch-screen. The user interface portion may include a speaker for audio output. The user interface portion 206 may include a microphone for audible input.

The communications portion 208 may be, in any combination of hardware and/or software, any component, system, and/or subsystem for providing communications to and/or from the WCNS 116. The communication provided by the communications portion 208 may include, but is not limited to an Internet 160 based connection, a wireless connection such as radio frequency for example, a telephone based dial-up connection and the like. The communications portion 208 may provide a wireless communications channel between the WCNS 116 and a peer device (not shown) and/or the WCN 114. The communications portion 208 may provide point-to-point wireless communications between the WCNS 116 and a peer device. The wireless communications portion 208 may provide radio frequency (RF) communications between the WCNS 116 and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+Enhanced Data Rate (EDR), BLUETOOTH® 2.1+EDR, Institute of Electrical and Electronics Engineers, Inc. (IEEE) specification 802.15.1, or the like.

The communications portion 208 may also include individual digital logic components, a processor, a microprocessor, and application-specific integrated circuit (ASIC), and the like. The communications portion 208 may include memory such as random access memory, register memory, cache memory and the like. The communications portion 208 and all communications portions and/or communications processors may include computer executable instructions by which the communications portion 208 may operate. For example, computer executable instructions may include computer executable code that, when executed, operate the relevant actions associated with the communications portion 208. For example, the computer executable instructions may operate the methods provided in FIG. 4 to FIG. 4F.

The memory of the communications portion 208 or the processor portion 204 may allow for the buffering or the storing of a call 132 in memory, such as in (but not limited to) a cache memory or the like.

Figure 7:
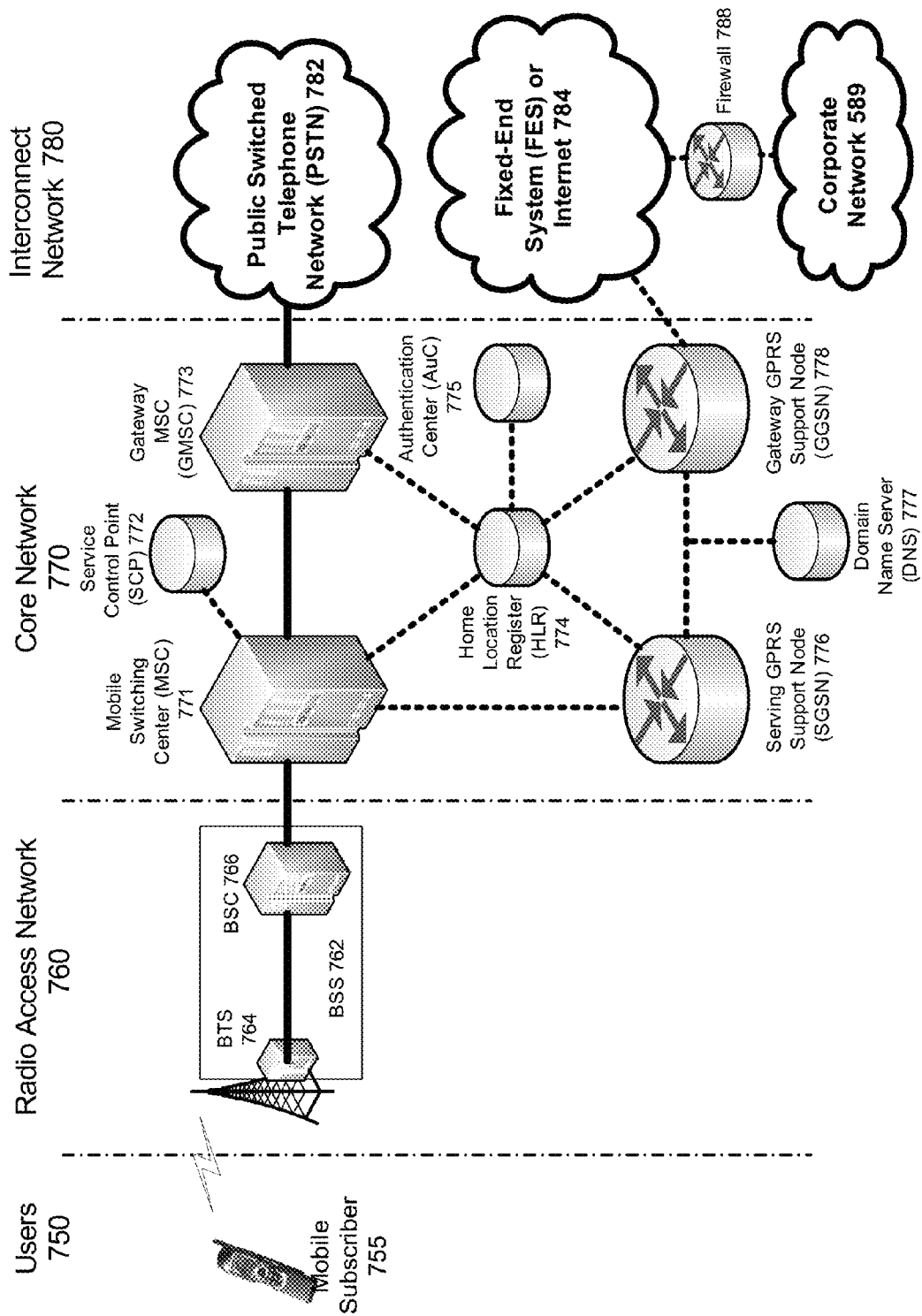
FIG. 7 depicts a GPRS network architecture in which aspects of an embodiment may be implemented.

The communications portion 208 may provide a wireless communications channel between the WCNS 116 and the WCN 114 such as the radio access network 760 (see FIG. 7). The communications portion 208 may provide cellular communications. The communication portion 208 may provide wireless data network communications such as, Wi-Fi (IEEE 802.11) and WiMAX (IEEE 802.16) for example.

The datastore 210 may be any component, system, and/or subsystem suitable for storing data. For example, the datastore portion 210 may include random access memory, flash memory, magnetic storage, and/or the like.

The datastore 210 may store thereon system data 212. The system data 212 may include contact information, e-mail data, spreadsheets, word processing data, task data, and/or the like.

The WCNS 116 typically includes a variety of computer readable media. Computer readable media can be any available media that can be accessed by the WCNS 116 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the WCNS 116.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The processor portion 204, and all processor portions disclosed in this specification, includes computer storage media in the form of volatile and/or nonvolatile memory such as read-only memory (ROM) and random access memory (RAM). A basic input/output system (BIOS), containing the basic routines that help to transfer information between elements within the WCNS 116, such as during start-up, is typically stored in ROM. RAM typically contains data and/or program modules that are immediately accessible to and/or presently being operated on by the processor 204.

The WCNS 116 may also include other removable/non-removable, volatile/nonvolatile computer storage media. By way of example only, a hard disk drive may read from or write to non-removable, nonvolatile magnetic media; a magnetic disk drive may read from or write to a removable, nonvolatile magnetic disk; and an optical disk drive may read from or write to a removable, nonvolatile optical disk such as a CD-ROM or other optical media. Other removable/non-removable, volatile/nonvolatile computer storage media that may be used in the WCNS 116 include, but are not limited to, magnetic tape cassettes, flash memory cards, digital versatile disks, digital video tape, solid state RAM, solid state ROM, and the like.

Figure 3:
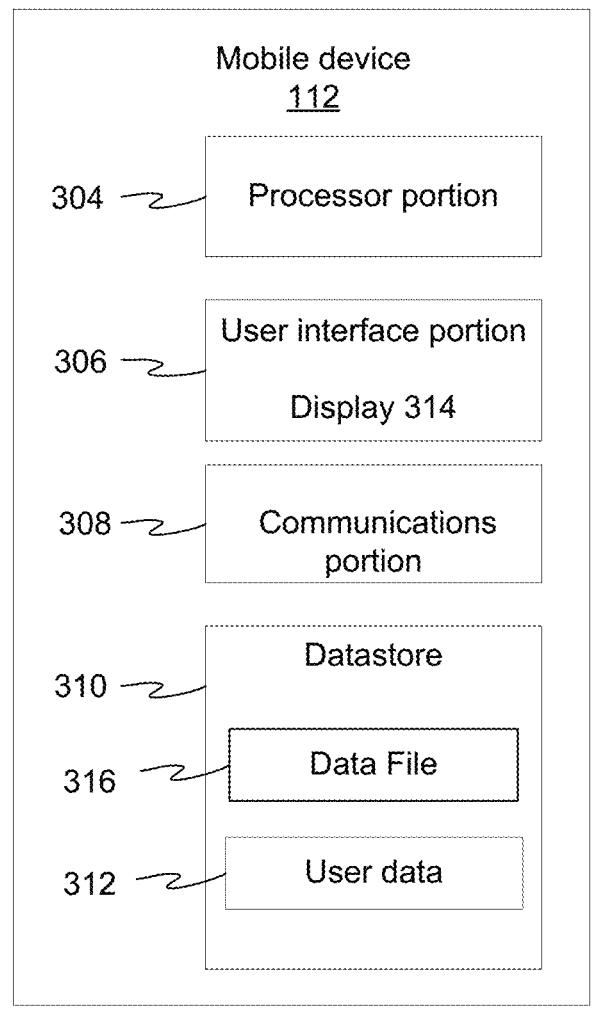
FIG. 3 depicts a block diagram of a mobile device in which aspects of an embodiment may be implemented.

FIG. 3 depicts a block diagram of an example mobile device 112 which may be implemented in embodiments. The mobile device 112 may include a processor portion 304, a user interface portion 306, a communications portion 308, and a datastore portion 310. The datastore portion 310 may have stored thereon user data 312.

The processor portion 304 may include any hardware and/or software necessary for operating and/or controlling the user interface portion 306, the wireless communications portion 308 and the datastore portion 310. The configuration, memory, and capabilities of the processor portion 304 are similar to those described previously regarding the processor portion 204.

The processor portion 304 is capable of recording, digitally or otherwise, either the call 132 or portions of the call 132. The recording and conversion capabilities of the processor portion 304 are similar to those described previously regarding the processor portion 204.

The processor portion 304 may be in communication with the user interface portion 306, the wireless communications portion 308 and/or the datastore portion 310. The processor portion 304 may control the user interface portion 306. For example, the processor portion 304 may direct the user interface portion 306 to output information visually and/or audibly, and the processor portion 304 may direct the user interface portion 306 to receive input from the user. The processor portion 304 may control the wireless communications portion 308. For example, the processor portion 304 may send and/or receive data via the wireless communications portion 308. The processor portion 304 may operate on the datastore 310 to detect events, invoke actions, apply exceptions, and/or receive overrides.

The user interface portion 306 may be, in any combination of hardware and/or software, any component, system and/or subsystem for receiving input from a user and outputting information to the user. The user interface portion 306 may include a display 314 and/or keyboard. The keyboard may be a numerical pad. For example, the user interface portion 306 may include a telephone keypad, programmable softkeys, operators such as but not limited to mechanical buttons and other input/out devices, touch-screens, and/or the like. The display may provide visual output in input, for example via a touch-screen. The user interface portion 306 may include a speaker for audio output. The user interface portion 306 may include a microphone for audible input.

The communications portion 308 may be, in any combination of hardware and/or software, any component, system, and/or subsystem for providing wireless communications to and/or from the mobile device 112. The communications portion 308 may provide a wireless communications channel between the mobile device 112 and a peer device (now shown) or the WCN 114. The communications portion 308 may provide point-to-point communications between the mobile device 112 and a peer device. The RF capability of the communications portion 308 and the communications protocols supported by the communications portion 308 are similar to those discussed previously regarding the communications portion 208. The communications portion 308 may also be in communication with a geographic location system 136, such as but limited to the Global Positioning Satellite System (GPS). The geographic location system 136 may provide the mobile device 112 or the WCNS 116 with a geographic location of the mobile device 112 in a variety of data formats.

The configuration, memory, and functionality of the communications portion 308 are similar to those discussed previously regarding the communications portion 208.

The memory of the communications portion 308 or the processor portion 304 may allow for the buffering or the storing of a call 132 in memory, such as in (but not limited to) a cache memory or the like.

The wireless communications portion 308 may provide a wireless communications channel between the mobile device 112 and the WCN 114 similar to that provided by the communications portion 208 as discussed previously.

The datastore 310 may be any component, system, and/or subsystem suitable for storing data. For example, the datastore portion 310 may include random access memory, flash memory, magnetic storage, and/or the like.

The datastore 310 may store thereon user data 312. The user data 312 may include contact information, e-mail data, spreadsheets, word processing data, task data, and/or the like. In an embodiment, the processor may invoke an action to delete and/or encrypt the user data 312.

Referring to FIG. 1, FIG. 2, FIG. 3, FIG. 5, and FIG. 5A, in an embodiment, the WCN 114 may be in wireless communication with the mobile device 112. The WCN 114 may include the CMS 118 and the WCNS 116 as part of the network. The CMS 118 and the WCNS 116 may be in communication with each other. The processor portion 204 or the communications portion 208 of the WCNS 116 may be configured to detect a call 132 to or from the mobile device 112 and also to determine an originator 134 of the call 132 to the mobile device 112. The processor portion 204 or the communications portion 208 of the WCNS 116 may also be configured to detect a signal that is indicative of a call 132 to or from, or otherwise associated with, the mobile device 112. The processor portion 204 or the communications portion 208 may also be configured to detect at least a first record cue 150. The first record cue 150 may be predetermined or may not be predetermined. The record cue 150 may also be referred to as a capture cue 150, a store cue 150, or a convert cue 150, but may primarily be referred to as a record cue 150. It should be understood that the first predetermined record cue 150, or record cues generally, are not intended to be limited to a record function only. The first predetermined record cue 150 may correspond to a first identifier 152. The identifier 153 may or may not be predetermined. By way of example and not limitation, the first predetermined record cue 150 may be a verbal cue spoken by the originator 134 or the user 126 during the call 132. The first predetermined record cue 150 may also be a signal generated by the originator 134 or the user 126 by way of a dual-tone multi function ("DTMF" function), for example.

The first predetermined identifier 152 may be, by way of example and not limitation, a meta tag, data identification tag, an electronic subject matter identifier, or the like. The processor portion 204 or the communications portion 208 may be configured to capture, or respectively capture, at least a first portion of the call 154 upon the first predetermined record cue 150 being detected. The processor portion 204 or the communications portion 208 may be configured to associate, or respectively associate, the first predetermined identifier 152 with the captured at least first portion of the call 156. The first predetermined identifier 152 may identify the at least first portion of the call 154 in the captured first portion of the call 156. The first predetermined identifier 152 may identify the subject matter of the at least first portion of the call 154 by way of the association.

The at least first portion of the call 154 may, by way of example and not limitation, be captured by recording the at least first portion of the call 154 in a file, or by storing the at least first portion of the call 154 in a memory, or the like. The first predetermined identifier 152 may be associated with the captured at least first portion of the call 156 in a number of ways. By way of example and not limitation, the association may include inserting the first predetermined identifier 152 into the captured at least first portion of the call 156. Also by way of example, an index file (not shown) may be created that corresponds to the captured at least first portion of the call 156. The index file may have a time-base that is identical to a timebase of the captured at least first portion of the call 156. The index file may indicate the correspondence of the first predetermined identifier 152 to the captured at least first portion of the call 156. In yet another example of association, a hyperlink (not shown) may be created that is identified by the first predetermined identifier 152. The hyperlink may be linked to the captured at least first portion of the call 156.

As depicted in FIG. 1, the processor portion 204 and the communications portion 208 of the WCNS 116 may be in communication with the Internet 160, and if so, the user 126 may configure the processor portion 204 and the communication portion 208 through a computer interface such as 124 that is also in communication with the Internet 160. The user 126 may also configure the WCNS 116 and the portions 204 and 208 through the mobile device 112.

An originator 134 may be determined via a number of ways, including but not limited to the identification corresponding to the call 132, a reverse look-up, information provided by the WCN 114, information provided by the user 126, or information provided by way of the Internet 160.

In an embodiment, the processor portion 204 or the communications portion 208 may be configured to convert the captured first portion of the call 156 into first data 158 and to write the first data 158 into a data file 216. The first predetermined identifier 152 may identify the first data 158 in the data file 216.

In an embodiment, the processor portion 204 or the communications portion 208 may also be configured to detect a second record cue 180. The second record cue 180 may or may not be predetermined. The second predetermined record cue 180 may correspond to a second identifier 182. The second identifier 182 may or may not be predetermined. By way of example and not limitation, the second predetermined record cue 180 may be a verbal cue spoken by the originator 134 or the user 126 during the call 132. The second predetermined record cue 180 may also be a signal generated by the originator 134 or the user 126 by way of a "DTMF" function, for example. The second predetermined identifier 182 may be, by way of example and not limitation, a meta tag, a data identification tag, an electronic subject matter identifier, or the like.

The processor portion 204 or the communications portion 208 may be configured to capture, or respectively capture, at least a second portion of the call 184 upon the second predetermined record cue 180 being detected. The processor portion 204 or the communications portion 208 may be configured to associate, or respectively associate, the second predetermined identifier 182 with the captured at least second portion of the call 186. The second predetermined identifier 182 may identify the at least second portion of the call 184 in the captured at least second portion of the call 186 by way of the association. The processor portion 204 or the communications portion 208 may be configured to convert the captured at least second portion of the call 186 into second data 188 and to write the second data 188 into the data file 216. The second predetermined identifier 182 may identify the second data 188 in the data file 216.

The at least second portion of the call 184 may, by way of example and not limitation, be captured by recording the at least second portion of the call 184 in a file, or by storing the at least second portion of the call 184 in a memory, or the like. The second predetermined identifier 182 may be associated with the captured at least second portion of the call 186 in a number of ways. By way of example and not limitation, the association may include inserting the second predetermined identifier 182 into the captured at least second portion of the call 186. Also by way of example, an index file (not shown) may be created that corresponds to the captured at least second portion of the call 186. The index file may have a time-base that is identical to a time-base of the captured at least second portion of the call 186. The index file may indicate the correspondence of the second predetermined identifier 182 to the captured at least second portion of the call 186. In yet another example of association, a hyperlink (not shown) may be created that is identified by the second predetermined identifier 182. The hyperlink may be linked to the captured at least second portion of the call 186.

By way of example and not limitation, the first predetermined record cue 150 may be the word "quantity." This first predetermined record cue 150 may correspond to a first predetermined identifier 152. At least a first portion of the call 154 may be captured when the user 126 or the originator 134 utters the word "quantity." The first predetermined identifier 152 may be associated with the captured first portion of the call 156 in such a way that the first predetermined identifier 152 may identify the first portion of the call 154 (or identify the subject matter thereof) in the captured first portion of the call 156 as related to the first predetermined record cue 150, in this case, "quantity." Therefore, if a customer originator 134 mentions a "quantity" in a call 132 to the vendor user 126, the call 132 (or at least a portion thereof) may be captured in such a way that the captured conversation corresponds to the quantity desired by the customer. The predetermined identifier 152 may be associated with the captured at least first portion of the call 156 to identity the at least first portion of the call 154 as relating to a "quantity."

In an embodiment, the processor portion 204 or the communications portion 208 may be configured to detect a plurality of predetermined record cues in a call 132. The processor portion 204 or the communications portion 208 may be configured to capture, or respectively capture, a plurality of portions of the call that are respectively associated with the plurality of predetermined record cues. The processor portion 204 or communications portion 208 may also be configured to respectively associate at least one predetermined identifier with the plurality of captured portions of the call. The respectively associated at least one predetermined identifier may identify the respective plurality of portions of the call in the captured plurality of portions of the call. In other words, multiple predetermined record cues may be detected during a call 132 and a corresponding number of portions of the call may be captured upon the respective predetermined record cues being detected. Thus, the captured plurality of portions of the call are effectively (or impliedly) associated, respectively, with the detected plurality of predetermined record cues. In addition, the at least one predetermined identifier is explicitly associated, respectively, with the plurality of captured portions of the call in such a way (as described previously) as to identify, respectively, the plurality of portions of the call in the plurality of captured portions of the call.

Further in the way of example only and not limitation, the captured at least first portion of the call 156 may be converted into first data 158 and the first data 158 may be written into the data file 216 in a way in which the first predetermined identifier 152 may identify the first data 158 as a "quantity" in the data file 216.

Also for purposes of example and not limitation, the first predetermined record cue 150 or second predetermined record cue 180 may be but are not limited to "price", "unit", "item description", "item number", "payment terms", "bill-to-address", "ship-to-address", "business fax", "business phone", "a mobile phone", "name", "title", "email", "web page", "business name", "business address", "street address", "state", "city", "post office code", "floor/suite", "telephone number", and the like. A "business address" may not be captured in its various constituent parts, but as a collective piece of information. A destination address may be captured by its constituent parts of a street address, a state, a city, a post office code, etc. In an embodiment, the processors 204, 208, 304, or 308 may be configured to generate an audible or visual signal or message via the mobile device 112 to the user 126 and/or the originator 134 to indicate that the first or second predetermined record cues 150/180 have been recognized, and thus at least a portion of the call 132 may be captured or otherwise memorialized.

In an embodiment, the processor portion 204 or the communications portion 208 may configured to detect a first report cue 162. The report cue 162 may or may not be predetermined. By way of example and not limitation, the first predetermined report cue 162 may be a verbal cue spoken by the originator 134 or the user 126 during the call 132 or after the call 132 has terminated. The first predetermined report cue 162 may also be a signal generated by the originator 134 or the user 126 by way of a "DTMF" function, for example. The processor portion 204 or the communications portion 208 may be configured to extract data 164 that corresponds to the first predetermined report cue 162 from the data file 216. The data 164 corresponding to the first predetermined report cue 162 may be identified by one or more of predetermined identifiers 166 that correspond to the first predetermined report cue 162. The processor portion 204 or the communications processor 208 may be configured to write the extracted data 164 that corresponds to the first predetermined report cue 162 into a first report file 168. The first report file 168 may have a format 170 that corresponds to the first predetermined report cue 162.

In an embodiment, the processor portion 204 or the communications portion 208 may be configured to detect a second report cue 172. The second predetermined report cue 172 may or may not be predetermined. By way of example and not limitation, the second predetermined report cue 172 may be a verbal cue spoken by the originator 134 or the user 126 during the call 132 or after the call 132 has terminated. The second predetermined report cue 172 may also be a signal generated by the originator 134 or the user 126 by way of a "DTMF" function, for example. The processor portion 204 or the communications portion 208 may be configured to extract data 174 that corresponds to the second predetermined report cue 172 from the data file 216. The data 174 corresponding to the second predetermined report cue 172 may be identified by one or more of predetermined identifiers 176 that may correspond to the second predetermined report cue 172. The processor portion 204 or the communications portion 208 may be configured to write the extracted data 174 that corresponds to the second predetermined report cue 172 into a second report file 178. The second report file 178 may have a format 170 that corresponds to the second predetermined report cue 172.

The predetermined identifiers 166 and 176 that correspond to the first predetermined report cue 162 and the second predetermined report cue 172, respectively, may include the first predetermined identifier 152 and/or the second predetermined identifier 182 and/or one or more of any other predetermined identifiers that are not explicitly listed.

The first report file 168 and the second report file 178 may be viewed from any device capable of receiving the format 170 of the report file 168 and 178, including but not limited to the mobile device 112 and the computer interface 124.

Figure 5:
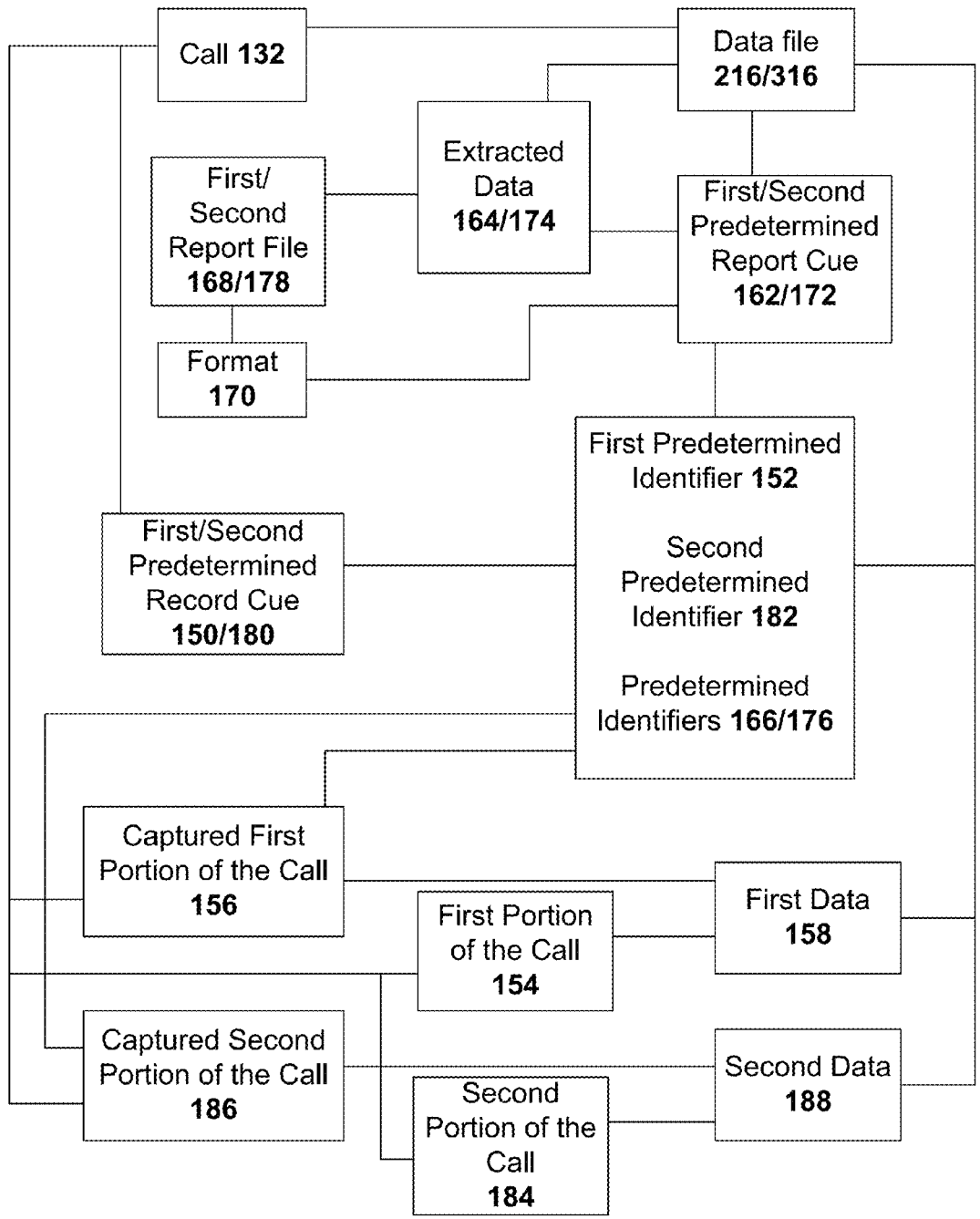
FIG. 5 depicts a block diagram of elements with which aspects of an embodiment may be implemented.
Figure 5A:
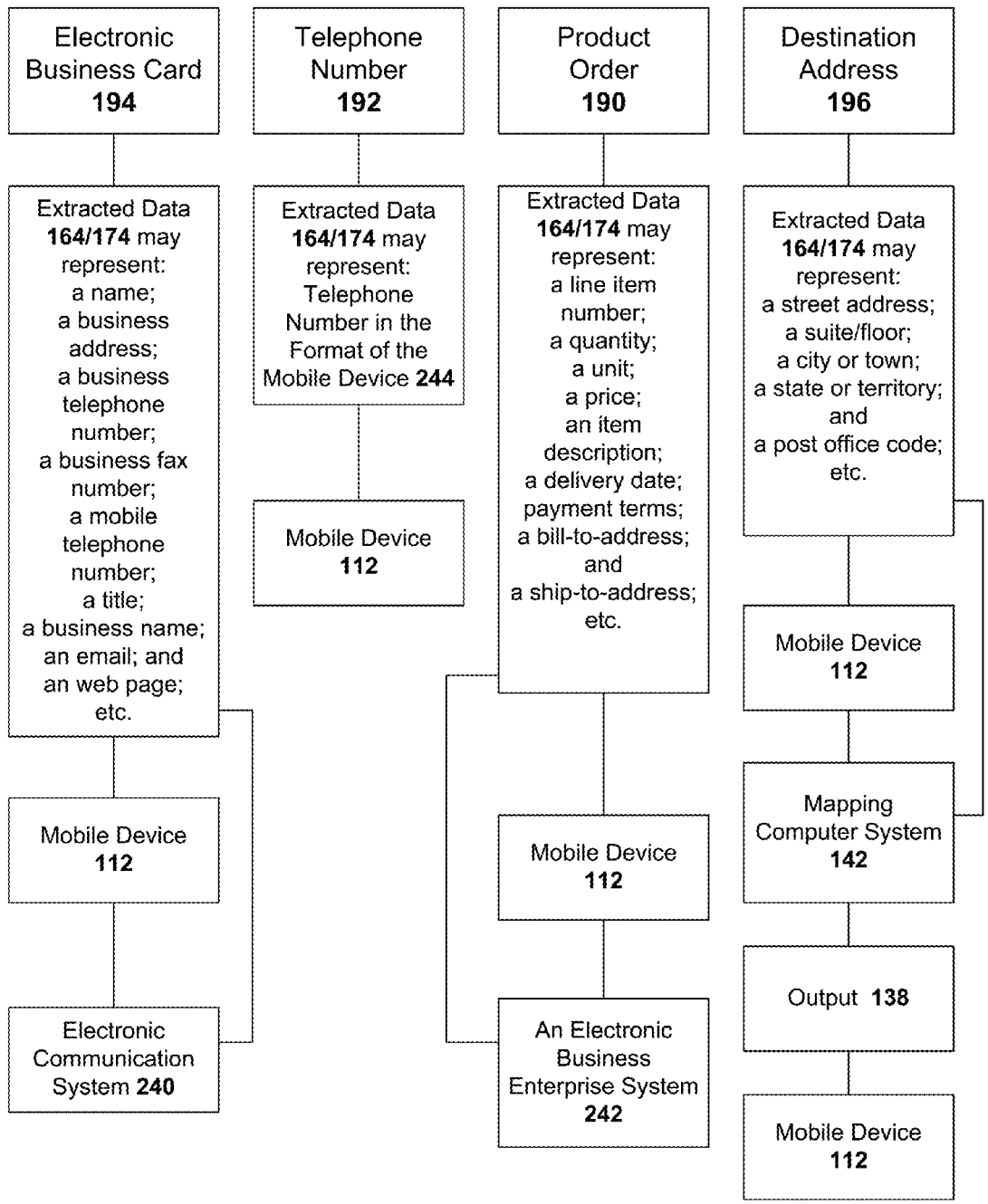
FIG. 5A depicts a block diagram of elements with which aspects of an embodiment may be implemented.

As shown in FIG. 5A, in embodiments, the first predetermined report cue 162 and/or the second predetermined report cue 172 may, by way of example and not limitation, correspond to a product order 190, a telephone number 192, an electronic business card 194, or a destination address 196.

In an embodiment in which either the first predetermined report cue 162 or the second predetermined report cue 172 corresponds to an electronic business card 194, the extracted data 164 or 174 may represent the electronic business card 194. By way of example only, the predetermined report cue 162 that corresponds to the electronic business card 194 may be a verbal cue uttered by the user 126 such as "report contact." By way of example and not limitation, if the first predetermined report cue 162 corresponds to an electronic business card 194, then the extracted data 164 may be identified by the one or more predetermined identifiers 166 in the data file 216 that correspond to the electronic business card 194. By way of example and not limitation, the extracted data 164 that may be identified in the data file 216 by the predetermined identifiers 166 include a name; a business telephone number, a business fax, a business address, a title, a business name, an email address, a web page URL, and the like. Also, the format 170 of the first report file 168 or the second report file 178 may be compatible with one or more electronic communication systems 240, such as but not limited to Microsoft Outlook, Lotus Notes, or the like.

In an embodiment in which the first predetermined report cue 162 or the second predetermined report cue 172 corresponds to a product order 190, the extracted data 164 or 174 may represent the product order 194. By way of example and not limitation, if the first predetermined report cue 162 corresponds to a product order 190, then the extracted data 164 may be identified by the one or more predetermined identifiers 166 in the data file 216 that correspond to the product order 190. By way of example only, the predetermined report cue 162 that corresponds to the product order 190 may be a verbal cue uttered by the user 126 such as "report order." By way of example and not limitation, the extracted data 164 that may be identified in the data file 216 by the predetermined identifiers 166 include an item number, a quantity, a unit, a price, an item description, payment terms, delivery date, bill-to address, ship-to address, and the like. Also, the format 170 of the first report file 168 or the second report file 178 may be compatible with one or more electronic business enterprise systems 242, such as those produced by, but not limited to, SAP, Oracle, or the like.

In an embodiment in which the first predetermined report cue 162 or the second predetermined report cue 172 corresponds to a telephone number 192, the extracted data 164 or 174 may represent the telephone number 192. By way of example and not limitation, if the first predetermined report cue 162 corresponds to a telephone number 192, then the extracted data 164 may be identified by the one or more predetermined identifiers 166 in the data file 216 that correspond to the telephone number 192. By way of example only, the predetermined report cue 162 that corresponds to the telephone number 192 may be a verbal cue uttered by the user 126 such as "report telephone number." Also, the format 170 of the first report file 168 or the second report file 178 may be compatible with a telephone number format 244 of the mobile device 112.

In an embodiment in which the first predetermined report cue 162 or the second predetermined report cue 172 corresponds to a destination address 196, the extracted data 164 or 174 may represent the destination address 196. The processor portions 204 or 304 or the communications portions 208 or 308 may be configured to detect a command cue in the call 132 that is indicative of a destination address 196. By way of example and not limitation, if the first predetermined report cue 162 corresponds to a destination address 196, then the extracted data 164 may be identified by the one or more predetermined identifiers 166 in the data file 216 that correspond to the destination address 196. By way of example only, the predetermined report cue 162 that corresponds to the destination address 196 may be a verbal cue uttered by the user 126 such as "report destination." By way of example and not limitation, the extracted data 164 that may be identified in the data file 216 by the predetermined identifiers 166 include a street address, a city or town, a state or territory, a post office code, a floor/suite, and the like. Also, the format 170 of the first report file 168 or the second report file 178 may be compatible with of a mapping computer program 142 and/or a driving directions program 144, or the like.

In an embodiment, the WCNS 116 may be in communication with a geographic location system 136. The geographic location system 136 may provide the WCNS 116 with a geographic location of the mobile device 112. The WCNS 116 may be in communication with the mapping computer program 142. The processor portion 204 or the communications portion 208 may be configured to, upon a predetermined command, input the mobile device's 112 geographic location into the mapping computer program 142, input the first report file 168 into the mapping computer program 142, and to receive an output 138 from the mapping program 142. The output 138 may indicate one or more geographic paths between the geographic location of the mobile device 112 and the destination address 196. The output 138 may be in the form of text-based directions or graphic-based directions that may be displayed in the display 314 of the mobile device 112. By way of example and not limitation, the predetermined command may be a verbal cue spoken by the user 126 during the call 132 or after the call 132 is terminated. The predetermined command may also be a signal generated by the user 126 by way of a "DTMF" function, for example.

In an embodiment, the processor portion 204 or the communications portion 208 may be configured to detect a call 132 to or from a mobile device 112 or to detect a call signal indicative of a call to or from, or otherwise associated with, a mobile device 112. The processor portion 204 or the communications processor 208 may be configured to detect the first predetermined record cue 150. The first predetermined record cue 150 may correspond to the first predetermined identifier 152. The processor portion 204 or communications portion 208 may be configured to convert the first portion of the call 154 into first data 158 upon the first predetermined record cue 150 being detected and to write the first data 158 into the data file 216. The processor portion 204 or communications portion 208 may be configured to associate the first predetermined identifier 152 with the data file 216. The first predetermined identifier 152 may identify the first data 158 in the data file 216.

In an embodiment, the processor portion 304 or the communications portion 308 of the mobile device 112 may be configured to detect a call 132 to or from the mobile device 112 and also to determine an originator 134 of the call 132 to the mobile device 112. The processor portion 304 or the communications portion 308 of the mobile device 112 may also be configured to detect a signal that is indicative of a call 132 to or from the mobile device 112. The processor portion 304 or the communications portion 308 may also be configured to detect a first predetermined record cue 150. The first predetermined record cue 150 may correspond to a first predetermined identifier 152. By way of example and not limitation, the first predetermined record cue 150 may be a verbal cue spoken by the originator 134 or the user 126 during the call 132. The first predetermined record cue 150 may also be a signal generated by the originator 134 or the user 126 by way of a dual-tone multi function ("DTMF" function), for example. The first predetermined identifier 152 may be, by way of example and not limitation, a meta tag, a data identification tag, an electronic subject matter identifier, or the like.

The processor portion 304 or the communications portion 308 may be configured to capture, or respectively capture, at least a first portion of the call 154 upon the first predetermined record cue 150 being detected. The processor portion 304 or the communications portion 308 may be configured to associate, or respectively associate, the first predetermined identifier 152 with the captured at least first portion of the call 156. The first predetermined identifier 152 may identify the at least first portion of the call 154 in the captured at least first portion of the call 156.

The capturing of the portions of the call 132 and the associating of the predetermined identifiers with the captured portions of the call 132 may be similar to, or identical to, the capturing and associating disclosed in the discussion of the previous embodiments.

In an embodiment, the processor portion 304 or the communications portion 308 may be configured to convert the captured at least first portion of the call 156 into first data 158 and to write the first data 158 into a data file 316. The first predetermined identifier 152 may identify the first data 158 in the data file 316.

In an embodiment, the processor portion 304 or the communications portion 308 may also be configured to detect a second predetermined record cue 180. The second predetermined record cue 180 may correspond to a second predetermined identifier 182. By way of example and not limitation, the second predetermined record cue 180 may be a verbal cue spoken by the originator 134 or the user 126 during the call 132. The second predetermined record cue 180 may also be a signal generated by the originator 134 or the user 126 by way of a "DTMF" function, for example. The second predetermined identifier 182 may be, by way of example and not limitation, a meta tag, a data identification tag, an electronic subject matter identifier, or the like.

The processor portion 304 or the communications portion 308 may be configured to capture, or respectively capture, at least a second portion of the call 184 upon the second predetermined record cue 180 being detected. The processor portion 304 or the communications portion 308 may be configured to associate, or respectively associate, the second predetermined identifier 182 with the captured at least second portion of the call 186. The second predetermined identifier 182 may identify the at least second portion of the call 184 in the captured second portion of the call 186. The processor portion 304 or the communications portion 308 may be configured to convert the captured at least second portion of the call 186 into second data 188 and to write the second data 188 into the data file 316. The second predetermined identifier 182 may identify the second data 188 in the data file 316.

In an embodiment, the processor portion 304 or the communications portion 308 may be configured to detect a plurality of predetermined record cues in a call 132. The processor portion 304 or the communications portion 308 may be configured to capture, or respectively capture, a plurality of portions of the call that are respectively associated with the plurality of predetermined record cues. The processor portion 304 or communications portion 308 may also be configured to respectively associate at least one predetermined identifier with the plurality of captured portions of the call. The respectively associated at least one predetermined identifier may identify the respective plurality of portions of the call in the captured plurality of portions of the call. In other words, multiple predetermined record cues may be detected during a call 132 and a corresponding number of portions of the call may be captured upon the respective predetermined record cues being detected. Thus, the captured plurality of portions of the call are effectively (or impliedly) associated, respectively, with the detected plurality of predetermined record cues. In addition, the at least one predetermined identifier is explicitly associated, respectively, with the plurality of captured portions of the call in such a way (as described previously) as to identify, respectively, the plurality of portions of the call in the plurality of captured portions of the call.

In an embodiment, the processor portion 304 or the communications portion 308 of the mobile device 112 may configured to detect a first predetermined report cue 162. By way of example and not limitation, the first predetermined report cue 162 may be a verbal cue spoken by the originator 134 or the user 126 during the call 132 or after the call 132 has terminated. The first predetermined report cue 162 may also be a signal generated by the originator 134 or the user 126 by way of a "DTMF" function, for example. The processor portion 304 or the communications portion 308 may be configured to extract data 164 that corresponds to the first predetermined report cue 162 from the data file 316. The data 164 corresponding to the first predetermined report cue 162 may be identified by one or more of predetermined identifiers 166 that correspond to the first predetermined report cue 162. The processor portion 304 or the communications processor 308 may be configured to write the extracted data 164 that corresponds to the first predetermined report cue 162 into a first report file 168. The first report file 168 may have a format 170 that corresponds to the first predetermined report cue 162.

In an embodiment, the processor portion 304 or the communications portion 308 may be configured to detect a second predetermined report cue 172. By way of example and not limitation, the second predetermined report cue 172 may be a verbal cue spoken by the originator 134 or the user 126 during the call 132 or after the call 132 has terminated. The second predetermined report cue 172 may also be a signal generated by the originator 134 or the user 126 by way of a "DTMF" function, for example. The processor portion 304 or the communications portion 308 may be configured to extract data 174 that corresponds to the second predetermined report cue 172 from the data file 316. The data 174 corresponding to the second predetermined report cue 172 may be identified by one or more of predetermined identifiers 176 that may correspond to the second predetermined report cue 172. The processor portion 304 or the communications processor 308 may be configured to write the extracted data 174 that corresponds to the second predetermined report cue 172 into a second report file 178. The second report file 178 may have a format 170 that corresponds to the second predetermined report cue 172.

The predetermined identifiers 166 and 176 that correspond to the first predetermined report cue 162 and the second predetermined report cue 172, respectively, may include the first predetermined identifier 152 and/or the second predetermined identifier 182 and/or one or more of any other predetermined identifiers that are not explicitly listed.

As shown in FIG. 5A, in embodiments, the first predetermined report cue 162 and/or the second predetermined report cue 172 may correspond to a product order 190, a telephone number 192, an electronic business card 194, or a destination address 196.

In an embodiment in which either the first predetermined report cue 162 or the second predetermined report cue 172 corresponds to an electronic business card 194, the extracted data 164 or 174 may represent the electronic business card 194. By way of example and not limitation, if the first predetermined report cue 162 corresponds to an electronic business card 194, then the extracted data 164 may be identified by the one or more predetermined identifiers 166 in the data file 316 that correspond to the electronic business card 194. By way of example and not limitation, the extracted data 164 that may be identified in the data file 316 by the predetermined identifiers 166 include a name; a business telephone number, a business fax, a business address, a title, a business name, an email address, a web page URL, and the like. Also, the format 170 of the first report file 168 or the second report file 178 may be compatible with one or more electronic communication systems 240, such as but not limited to Microsoft Outlook, Lotus Notes, or the like.

In an embodiment in which the first predetermined report cue 162 or the second predetermined report cue 172 corresponds to a product order 190, the extracted data 164 or 174 may represent the product order 194. By way of example and not limitation, if the first predetermined report cue 162 corresponds to a product order 190, then the extracted data 164 may be identified by the one or more predetermined identifiers 166 in the data file 316 that correspond to the product order 190. By way of example and not limitation, the extracted data 164 that may be identified in the data file 316 by the predetermined identifiers 166 include a item number, a quantity, a unit, a price, an item description, payment terms, delivery date, bill-to address, ship-to address, and the like. Also, the format 170 of the first report file 168 or the second report file 178 may be compatible with one or more electronic business enterprise systems 242, such as those produced by, but not limited to, SAP, Oracle, or the like.

In an embodiment in which the first predetermined report cue 162 or the second predetermined report cue 172 corresponds to a telephone number 192, the extracted data 164 or 174 may represent the telephone number 192. By way of example and not limitation, if the first predetermined report cue 162 corresponds to a telephone number 192, then the extracted data 164 may be identified by the one or more predetermined identifiers 166 in the data file 316 that correspond to the telephone number 192. Also, the format 170 of the first report file 168 or the second report file 178 may be compatible with a telephone number format 244 of the mobile device 112.

In an embodiment in which the first predetermined report cue 162 or the second predetermined report cue 172 corresponds to a destination address 196, the extracted data 164 or 174 may represent the destination address 196. The processor portions 204 or 304 or the communications portions 208 or 308 may be configured to detect a command cue in the call 132 that is indicative of a destination address 196. By way of example and not limitation, if the first predetermined report cue 162 corresponds to a destination address 196, then the extracted data 164 may be identified by the one or more predetermined identifiers 166 in the data file 316 that correspond to the destination address 196. By way of example and not limitation, the extracted data 164 that may be identified in the data file 316 by the predetermined identifiers 166 include a street address, a city or town, a state or territory, a post office code, a floor/suite, and the like. Also, the format 170 of the first report file 168 or the second report file 178 may be compatible with of a mapping computer program 142 and/or a driving directions program 144.

In an embodiment, the mobile device 112 may be in communication with a geographic location system 136. The geographic location system 136 may provide a geographic location of the mobile device 112. The mobile device may be in communication with the mapping computer program 142. The processor portion 304 or the communications portion 308 may be configured to, upon a predetermined command, input the mobile device's 112 geographic location into the mapping computer program 142, input the first report file 168 into the mapping computer program 142, and to receive an output 138 from the mapping program 142. The output 138 may indicate one or more geographic paths between the geographic location of the mobile device 112 and the destination address 196. The output 138 may be in the form of text-based directions or graphic-based directions that may be displayed in the display 314 of the mobile device 112.

In an embodiment, the processor portion 304 or the communications portion 308 of the mobile device 112 may be configured to detect a call 132 to or from a mobile device 112 or to detect a signal indicative of a call 132 to or from a mobile device 112. The processor portion 304 or the communications processor 308 may be configured to detect the first predetermined record cue 150. The first predetermined record cue 150 may correspond to the first predetermined identifier 152. The processor portion 304 or communications portion 308 may be configured to convert at least a first portion of the call 154 into first data 158 upon the first predetermined record cue 150 being detected and to write the first data 158 into the data file 316. The processor portion 304 or communications portion 308 may be configured to associate the first predetermined identifier 152 with the first data 158. The first predetermined identifier 152 may identify the first data 158 in the data file 316.

Figure 4:
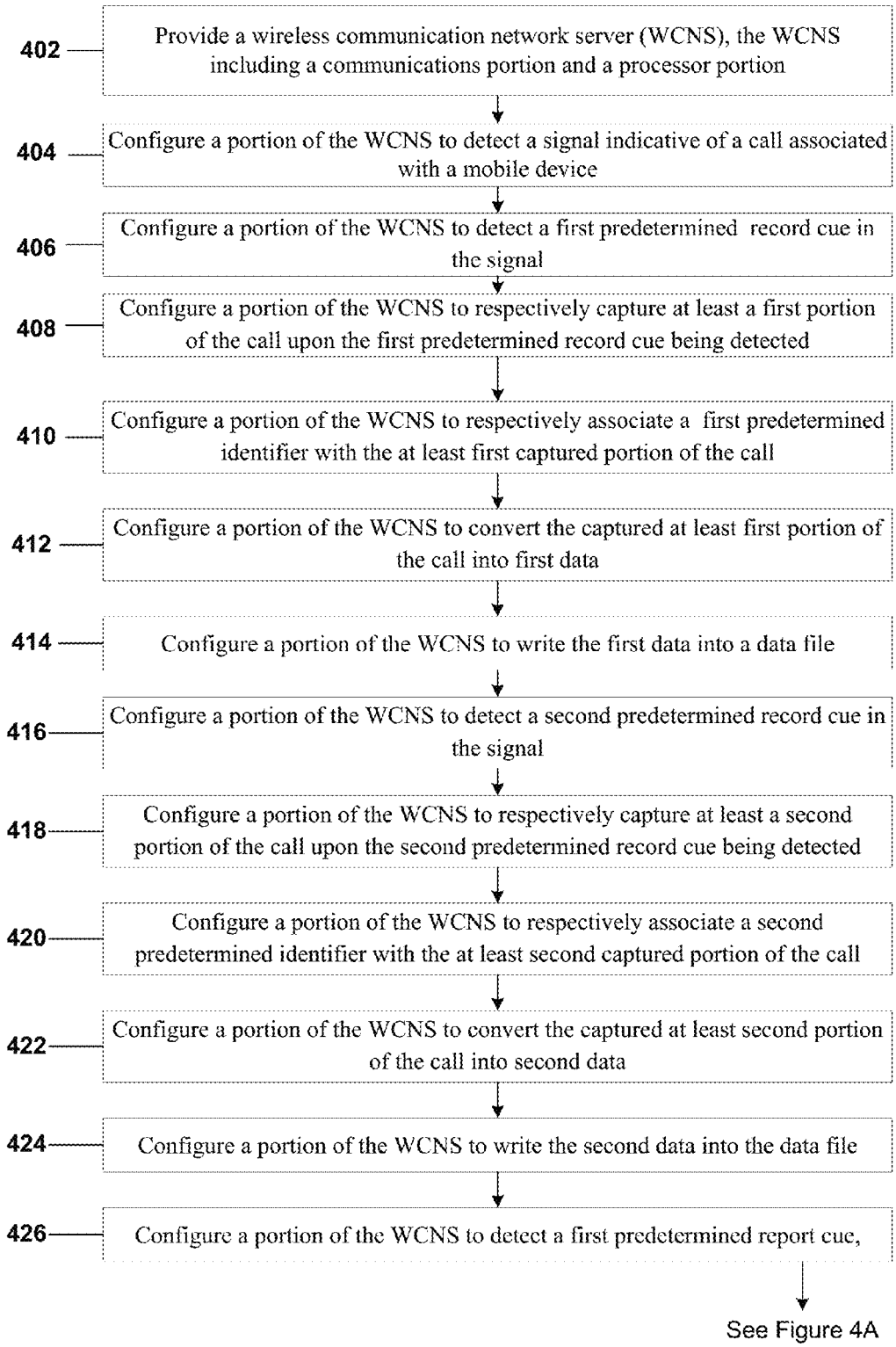
FIG. 4 depicts a process in which aspects of an embodiment may be implemented.
Figure 4A:
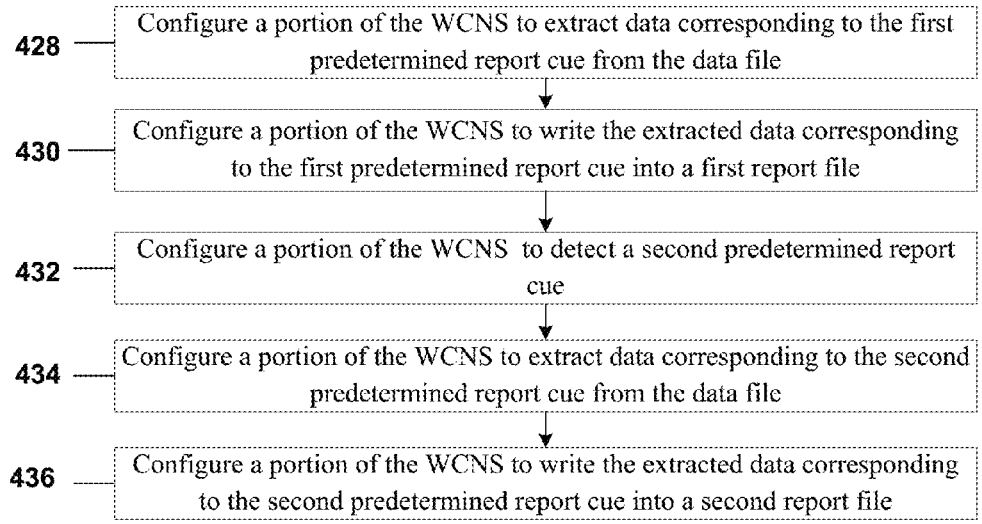
FIG. 4A depicts a continuation of the process described in FIG. 4 and aspects of an alternate process embodiment.

FIG. 4 and FIG. 4A illustrate a flow chart of illustrative embodiments for methods of configuring elements of a wireless communication system, such as but not limited to the elements associated with the WCS 110. In step 402, a method may comprise providing a WCNS 116; the WCNS 116 may include a communications portion 208 and a processor portion 204. In step 404, the method may also comprise configuring the processor portion 204 or the communications portion to detect a call 132 to or from the mobile device 112 or to detect a signal that is indicative of a call 132 to or from, or otherwise associated with, a mobile device 112. In step 406, the method may comprise configuring the processor portion 204 or the communications portion 208 to detect at least one first predetermined record cue 150. The first predetermined record cue 150 may correspond to a first predetermined identifier 152. In step 408, the method may comprise configuring the processor portion 204 or the communications portion 208 to capture, or respectively capture, at least a first portion of the call 154 upon the first predetermined record cue 150 being detected. In step 410, the method may comprise configuring the processor portion 204 or the communications portion 208 to associate, or respectively associate, the first predetermined identifier 152 with the captured at least first portion of the call 156. The first predetermined identifier 152 may identify the first portion of the call 154 in the captured at least first portion of the call 156.

In step 412, the processor portion 204 or the communications portion 208 may be configured to convert the captured at least first portion of the call 156 into first data 158 and, in step 414, to write the first data 158 into a data file 216. The first predetermined identifier 152 may identify the first data 158 in the data file 216.

In step 416, the method may comprise configuring the processor portion 204 or the communications portion 208 to detect a second predetermined record cue 180. The second predetermined record cue 180 may correspond to a second predetermined identifier 182. In step 418, the method may comprise configuring the processor portion 204 or the communications portion 208 to capture, or respectively capture, at least a second portion of the call 184 upon the second predetermined record cue 180 being detected. In step 420, the method may also comprise configuring the processor portion 204 or the communications portion 208 to associate, or respectively associate, the second predetermined identifier 182 with the captured at least second portion of the call 186. The second predetermined identifier 182 may identify the at least second portion of the call 184 in the captured at least second portion of the call 186.

In step 422, the method may comprise configuring the processor portion 204 or the communications portion 208 to convert the captured at least second portion of the call 186 into second data 188 and, in step 424, to write the second data 188 into the data file 216. The second predetermined identifier 182 may identify the second data 188 in the data file 216.

In step 426, the method may comprise configuring the processor portion 204 or the communications portion 208 to detect a first predetermined report cue, and in step 428, to extract data corresponding to the first predetermined report cue 164 from the data file 216. The data corresponding to the first predetermined report cue 164 may be identified by one or more predetermined identifiers 166 that may correspond to the first predetermined report cue 162. In step 430, the method may comprise configuring the processor portion 204 or the communications portion 208 to write the extracted data corresponding to the first predetermined report cue 164 into a first report file 168. The first report file 168 may have a format 170 that corresponds to the first predetermined report cue 162.

In step 432, the method may comprise configuring the processor portion 204 or the communications portion 208 to detect a second predetermined report cue 172 and, in step 434 to extract data corresponding to the second predetermined report cue 174 from the data file 216. The data corresponding to the second predetermined report cue 174 may be identified by one or more predetermined identifiers 176 that may correspond to the second predetermined report cue 172. In step 436, the method may comprise configuring the processor portion 204 or the communications portion 208 to write the extracted data corresponding to the second predetermined report cue 174 into a second report file 178. The second report file 178 may have a format 170 that may correspond to the second predetermined report cue 172.

The predetermined identifiers 166 and 176 that correspond to the first predetermined report cue 162 and the second predetermined report cue 172, respectively, may include the first predetermined identifier 152 and/or the second predetermined identifier 182 and/or one or more of any other predetermined identifiers that are not explicitly listed.

Figure 4B:
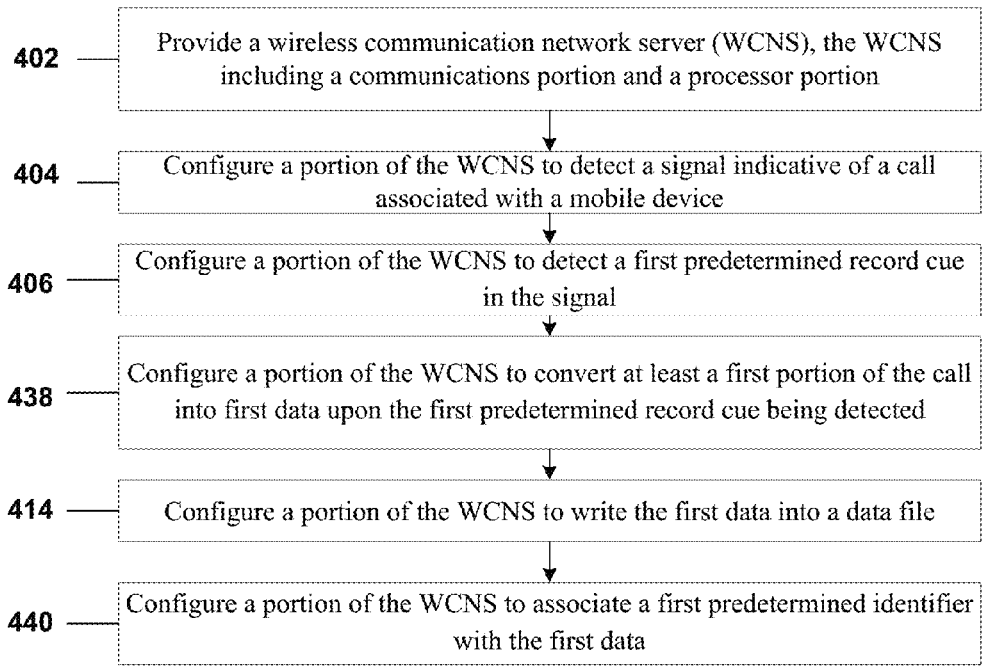
FIG. 4B depicts a process in which aspects of an alternate embodiment may be implemented.

As depicted in FIG. 4B, in another embodiment, a method may comprise, in step 402, providing the WCNS 116, the WCNS 116 may include a communications portion 208 and a processor portion 204. In step 404, the processor portion 204 or the communications portion 208 may be configured detect a call 132 to or from the mobile device 112 or to detect a signal indicative of a call 132 to or from, or otherwise associated with, a mobile device 112. In step 406, the method may comprise configuring the processor portion 204 or the communications portion 208 to detect a first predetermined record cue 150. The first predetermined record cue 150 may correspond to a first predetermined identifier 152. In step 438, the method may comprise configuring the processor 204 or the communication processor 208 to convert at least a first portion of the call 154 into first data 158 upon the first predetermined record cue 150 being detected. In step 414, the method may comprise configuring the processor portion 204 or the communications 208 to write the first data 158 into a data file 216. In step 440, the method may comprise configuring the processor portion 204 or the communications portion 208 to associate the first predetermined identifier 152 with the first data 158. The first predetermined identifier 152 may identify the first data 158 in the data file 216.

Figure 4C:
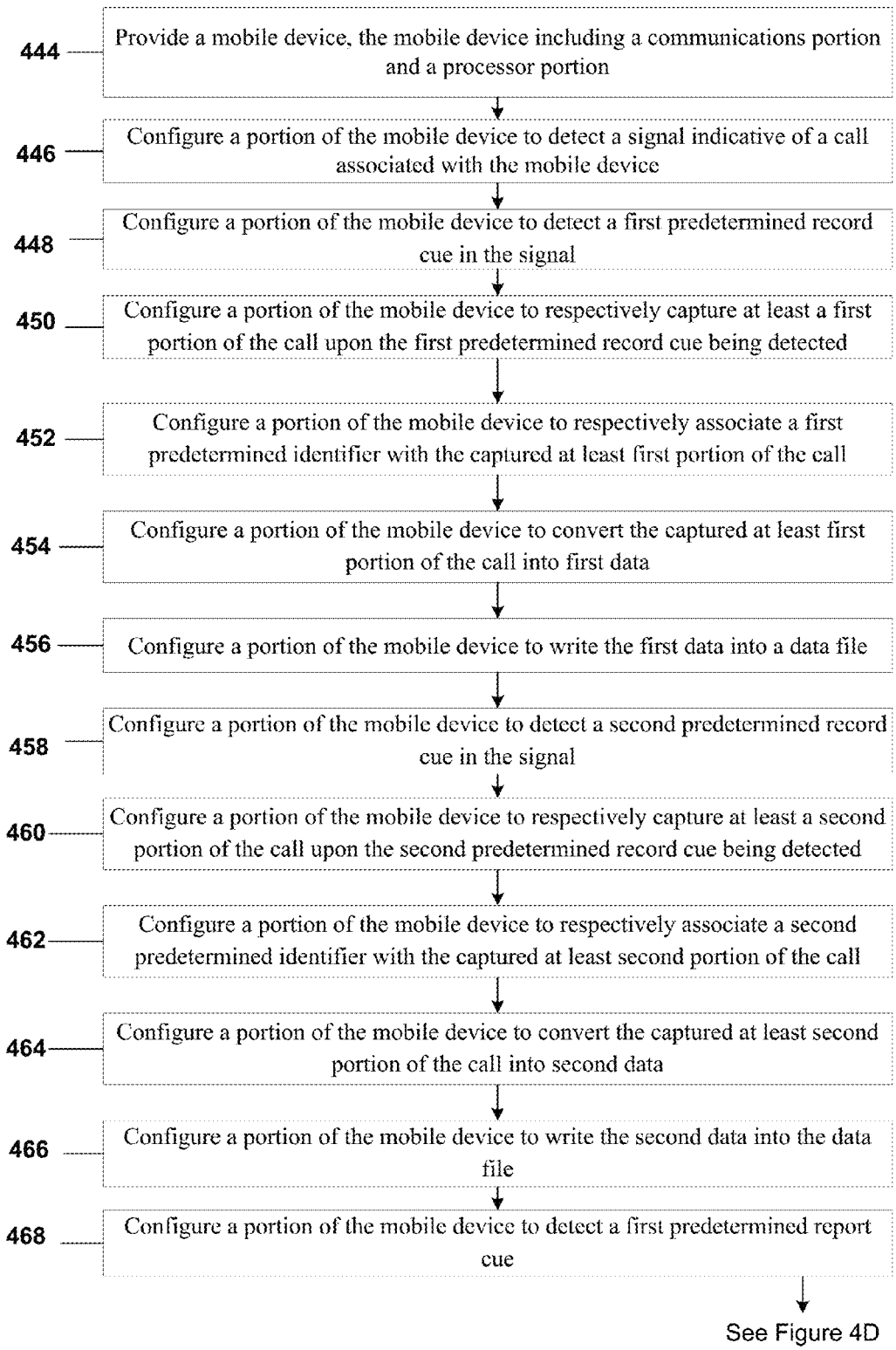
FIG. 4C depicts a process in which aspects of an alternate embodiment may be implemented.
Figure 4D:
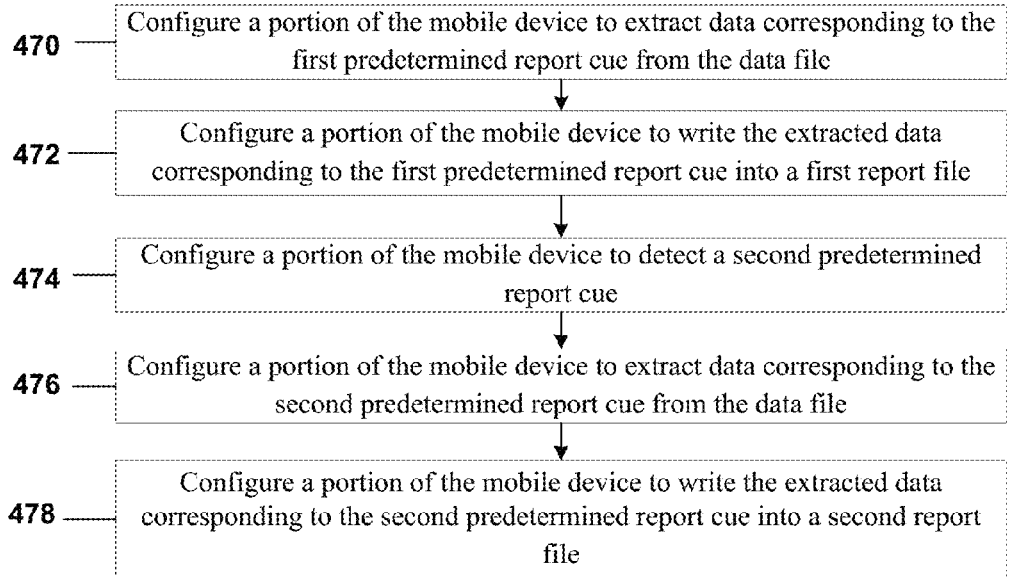
FIG. 4D depicts a continuation of the process described in FIG. 4C and aspects of an alternate process embodiment.

As depicted in FIG. 4C and FIG. 4D, in another embodiment, a method for configuring a mobile device 112 may, in step 444, comprise providing the mobile device 112, the mobile device 112 may include a communications portion 308 and a processor portion 304. In step 446, the method may comprise configuring the communications processor 308 or the processor portion 304 to detect a call 132 to or from the mobile device 112 or to detect a signal indicative of a call 132 to or from the mobile device 112. In step 448, the method may comprise configuring the processor portion 304 or the communications portion 308 to detect a first predetermined record cue 150. The first predetermined record cue 150 may correspond to a first predetermined identifier 152. In step 450, the method may comprise configuring the processor portion 304 or the communications portion 308 to capture, or respectively capture, at least a first portion of the call 154 upon the first predetermined record cue 150 being detected. In step 452, the method may include configuring the processor portion 304 or the communications processor 308 to associate, or respectively associate, the first predetermined identifier 152 with the captured at least first portion of the call 156. The first predetermined identifier 152 may identify the at least first portion of the call 154 in the captured at least first portion of the call 156.

In step 454, the method may include configuring the processor portion 304 or communications portion 308 to convert the captured at least first portion of the call 156 into first data 158, and in step 456, to write the first data 158 into a data file 316. The first predetermined identifier 152 may identify the first data 158 in the data file 316.

In step 458, the method may include configuring the processor portion 304 or the communications portion 308 to detect a second predetermined record cue 180. The second predetermined record cue 180 may correspond to a second predetermined identifier 182. In step 460, the method may include configuring the processor portion 304 or the communications portion 308 to capture, or respectively capture, at least a second portion of the call 184 upon the second predetermined record cue 180 being detected. In step 462, the method may include configuring the processor portion 304 or the communications portion 308 to associate, or respectively associate, the at least second predetermined identifier 182 with the captured at least second portion of the call 186. The second predetermined identifier 182 may identify the at least second portion of the call 184 in the captured at least second portion of the call 186.

In step 464, the method may comprise configuring the processor portion 304 or the communications portion 308 to convert the captured at least second portion of the call 186 into second data 188, and in step 466 to write the second data 188 into the data file 316. The second predetermined identifier 182 may identify the second data 188 in the data file 316.

In step 468, the method may include configuring the processor portion 304 or the communications portion 308 to detect a first predetermined report cue 162. In step 470, the method may include configuring the processor portion 304 or the communications portion 308 to extract data corresponding to the first predetermined report cue 164 from the data file 316. The data corresponding to the first predetermined report cue 164 may be identified by one or more predetermined identifiers 166 that may correspond to the first predetermined report cue 162. In step 472, the method may include configuring the processor portion 304 or the communications portion 308 to write the extracted data corresponding to the first predetermined report cue 164 into a first report file 168. The first report file 168 may have a format 170 corresponding to the first predetermined report cue 162.

In step 474, the method may comprise configuring the processor portion 304 or the communications portion 308 to detect a second predetermined report cue 172 and, in step 476 to extract data corresponding to the second predetermined report cue 174 from the data file 316. The data corresponding to the second predetermined report cue 174 may be identified by one or more predetermined identifiers 176 that may correspond to the second predetermined report cue 172. In step 478, the method may comprise configuring the processor portion 304 or the communications portion 308 to write the extracted data corresponding to the second predetermined report cue 174 into a second report file 178. The second report file 178 may have a format 170 that may correspond to the second predetermined report cue 172.

The predetermined identifiers 166 and 176 that correspond to the first predetermined report cue 162 and the second predetermined report cue 172, respectively, may include the first predetermined identifier 152 and/or the second predetermined identifier 182 and/or one or more of any other predetermined identifiers that are not explicitly listed.

Figure 4E:
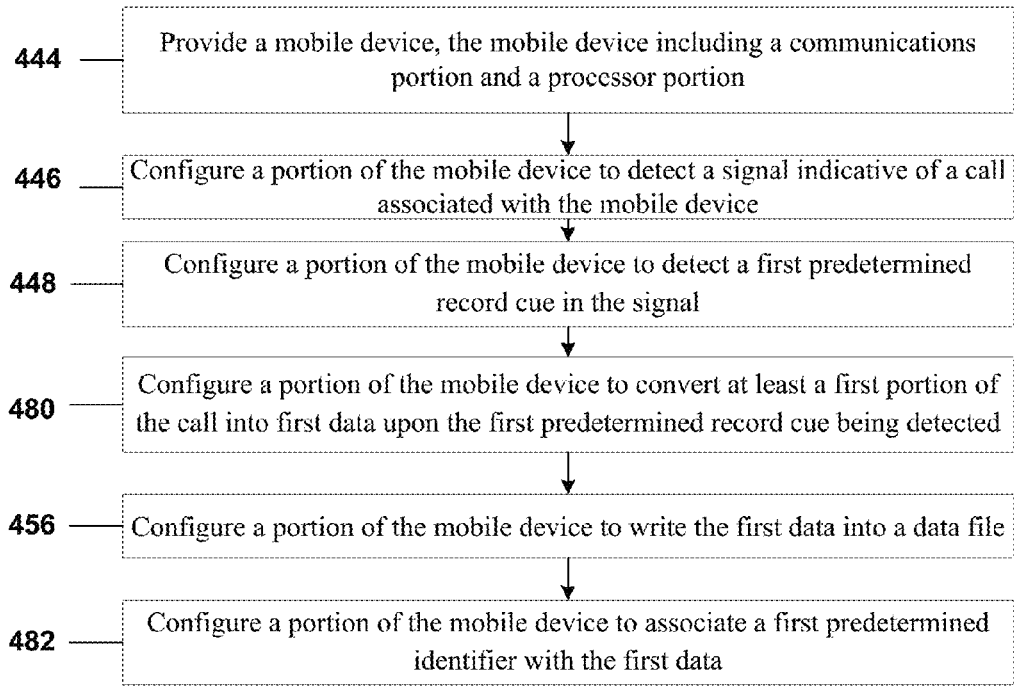
FIG. 4E depicts a process in which aspects of an alternate embodiment may be implemented.

As depicted in FIG. 4E, in another embodiment, a method may comprise, in step 444, providing the mobile device 112, the mobile device 112 may include a communications portion 308 and a processor portion 304. In step 446, the processor portion 304 or the communications portion 308 may be configured to detect a call 132 to or from the mobile device 112 or to detect a signal indicative of a call 132 to or from a mobile device 112. In step 448, the method may comprise configuring the processor portion 304 or the communications portion 308 to detect a first predetermined record cue 150. The first predetermined record cue 150 may correspond to a first predetermined identifier 152. In step 480, the method may comprise configuring the processor 304 or the communication processor 308 to convert at least a first portion of the call 154 into first data 158 upon the first predetermined record cue 150 being detected. In step 456, the method may comprise configuring the processor portion 304 or the communications 308 to write the first data 158 into a data file 316. In step 482, the method may comprise configuring the processor portion 304 or the communications portion 308 to associate the first predetermined identifier 152 with the first data 158. The first predetermined identifier 152 may identify the first data 158 in the data file 316.

In an embodiment, the first predetermined report cue 162 may correspond to a product order 190, a telephone number 192, an electronic business card 194, or a destination address 196. In an embodiment in which the first predetermined report cue 162 corresponds to a destination address 196, the extracted data 164 may represent the destination address 196, and format 170 of the first report file 168 may be compatible with either a mapping computer program 142 or a driving directions computer program 144.

Figure 4F:
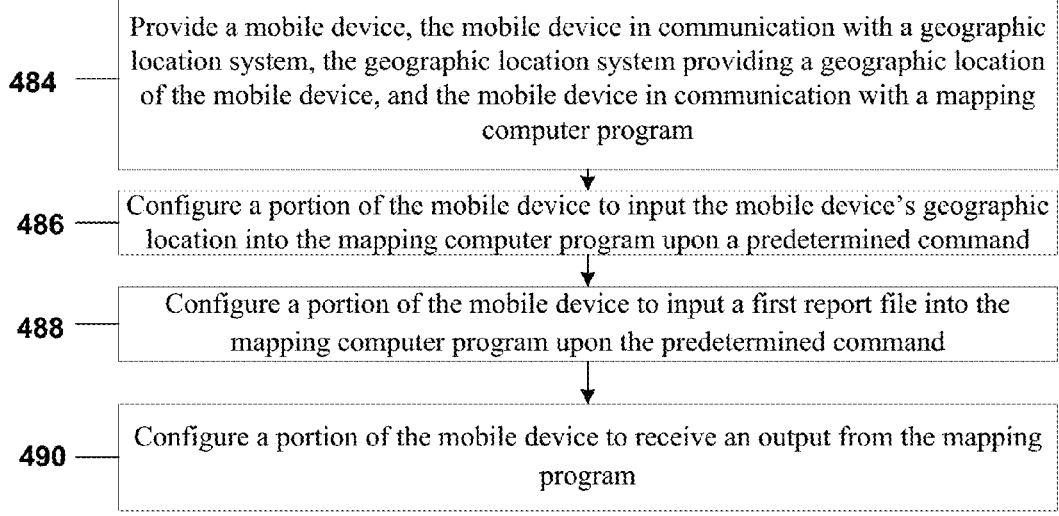
FIG. 4F depicts a process in which aspects of an alternate embodiment may be implemented.

As depicted in FIG. 4F, in another embodiment, in step 484, a method may include providing the mobile device 112, the mobile device 112 may be in communication with a geographic location system 136. The geographic location system 136 may provide a geographic location of the mobile device 112, and the mobile device 112 may be in communication with the mapping computer program 142. In step 486, the processor portion 304 or the communications portion 308 may be configured, upon a predetermined command, to input the mobile device's 112 geographic location into the mapping computer program 142. In step 488, the processor portion 304 or the communications portion 308 may be configured to input the first report file 168 into the mapping computer program 142. In step 490, the method may include configuring the processor portion 304 or the communications portion 308 to receive an output 138 from the mapping program 142. The output 138 may indicate one or more geographic paths between the geographic location of the mobile device 112 and the destination address 196.

Figure 4G:
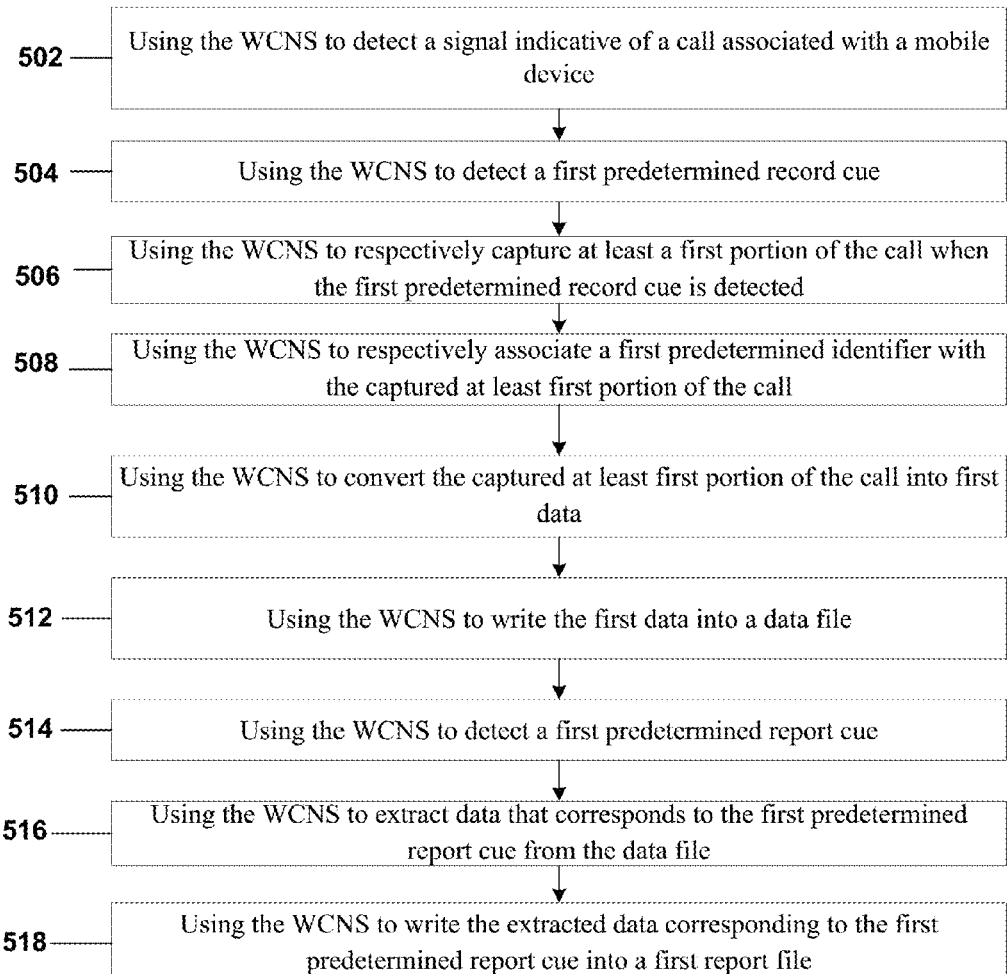
FIG. 4G depicts a process in which aspects of an alternate embodiment may be implemented.

Referring now to FIG. 4G, a method of using the WCNS 116 may comprise, in step 502, detecting a signal indicative of a call 132 to or from a mobile device 112 or a call 132 to or from a mobile device 112. In step 504, the WCNS 116 may be used to detect a first predetermined record cue 150. In step 506, the WCNS 116 may be used to capture, or respectively capture, at least a first portion of the call 154 when the first predetermined record cue 150 is detected. In step 508, the WCNS 116 maybe used to associate, or respectively associate, a first predetermined identifier 152 with the captured at least first portion of the call 156. The first predetermined identifier 152 may identify the at least first portion of the call 154 in the captured at least first portion of the call 156.

In an embodiment, the method of using the WCNS 116 may also include, in step 510, converting the captured at least first portion of the call 156 into first data 158, and in step 512, the WCNS 116 may be used to write the first data 158 into a data file 216. The first predetermined identifier 152 may identify the first data 158 in the data file 216.

In an embodiment, the method of using the WCNS 116 may also include, in step 514, detecting a first predetermined report cue 162. In step 516, the WCNS 116 may be used to extract data 164 that corresponds to the first predetermined report cue 162 from the data file 216. The data corresponding to the first predetermined report cue 162 may be identified by one or more predetermined identifiers 166 that may correspond to the first predetermined report cue 162. In step 518, the WCNS 116 may be used to write the extracted data 164 corresponding to the first predetermined report cue 162 into a first report file 168. The first report file 168 may have a format 170 corresponding to the first predetermined report cue 162.

Figure 4H:
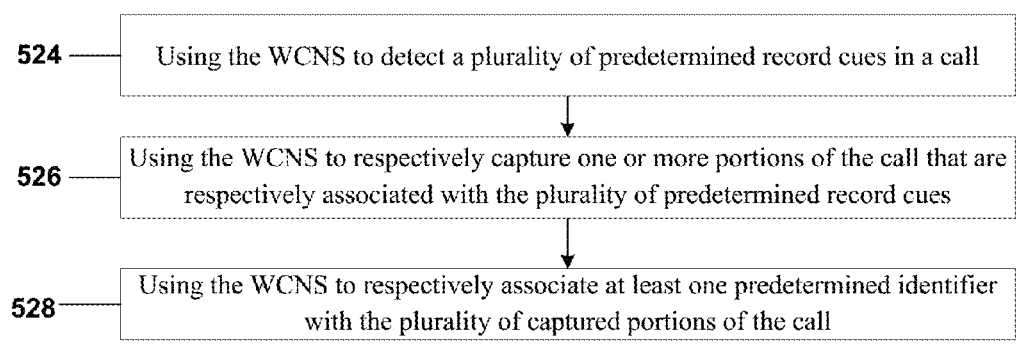
FIG. 4H depicts a process in which aspects of an alternate embodiment may be implemented.

Referring to FIG. 4H, in an embodiment, the WCNS 116 may, in a step 524, be used to detect a plurality of predetermined record cues in the call 132. In a step 526, the WCNS 116 may be used to capture, or respectively capture, one or more portions of the call that are respectively associated with the plurality of predetermined record cues. In a step 528, the WCNS 116 may be used to respectively associate at least one predetermined identifier with the plurality of captured portions of the call. The respectively associated at least one predetermined identifier may identify the respective plurality of portions of the call in the captured plurality portions of the call.

Figure 4I:
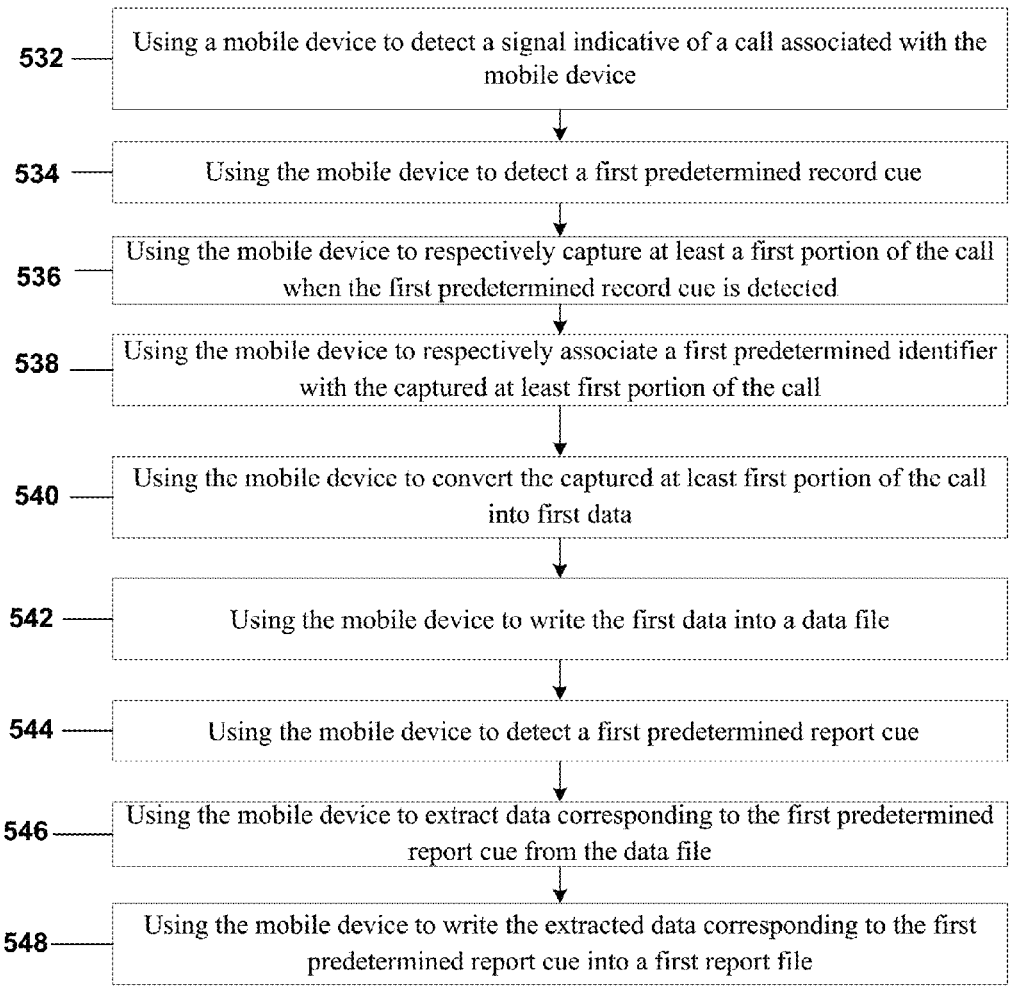
FIG. 4I depicts a process in which aspects of an alternate embodiment may be implemented.

Referring to FIG. 4I, in an embodiment, a method of using the mobile device 112 may comprise, in step 532, detecting a call 132 to or from the mobile device 112 or a signal indicative of a call 132 to or from the mobile device 112. In step 534, the mobile device 112 may be used to detect a first predetermined record cue 150. In step 536, the mobile device 112 may be used to capture, or respectively capture, at least a first portion of the call 154 when the first predetermined record cue 150 is detected. In step 538, the mobile device 112 may be used to associate, or respectively associate, a first predetermined identifier 152 with the captured at least first portion of the call 156. The first predetermined identifier 152 may identify the at least first portion of the call 154 in the captured at least first portion of the call 156.

In an embodiment, the method of using the mobile device 112 may include, in step 540, converting the captured at least first portion of the call 156 into first data 158, and in step 542 the mobile device 112 may be used to write the first data 158 into a data file 316. The first predetermined identifier 152 may identify the first data 158 in the data file 316.

In an embodiment, the method of using the mobile device 112 may include, in step 544, detecting a first predetermined report cue 162. In step 546, the mobile device 112 may be used to extracting data 164 corresponding to the first predetermined report cue 162 from the data file 316. The data corresponding to the first predetermined report cue 162 may be identified by one or more predetermined identifiers 166 that may correspond to the first predetermined report cue 162. In step 548, the mobile device 112 may be used to write the extracted data 164 corresponding to the first predetermined report cue 162 into a first report file 168. The first report file 168 may have a format 170 that corresponds to the first predetermined report cue 162.

The following description sets forth some exemplary telephony radio networks and non-limiting operating environments for the wireless communications system (WCN) 110. The below-described operating environments should be considered non-exhaustive, however, and thus the below-described network architectures merely show how the above described embodiments of the WCNS 116 and/or the mobile device 112 may be incorporated into existing network structures and architectures. It can be appreciated, however, that the above described embodiments of the WCNS 116 and/or the mobile device 112 can be incorporated into existing future alternative architectures for wireless communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the above described embodiments of the WCNS 116 and/or the mobile device 112 can be applied independently of the method for data transport, and do not depend on any particular network architecture, or underlying protocols.

Figure 6:
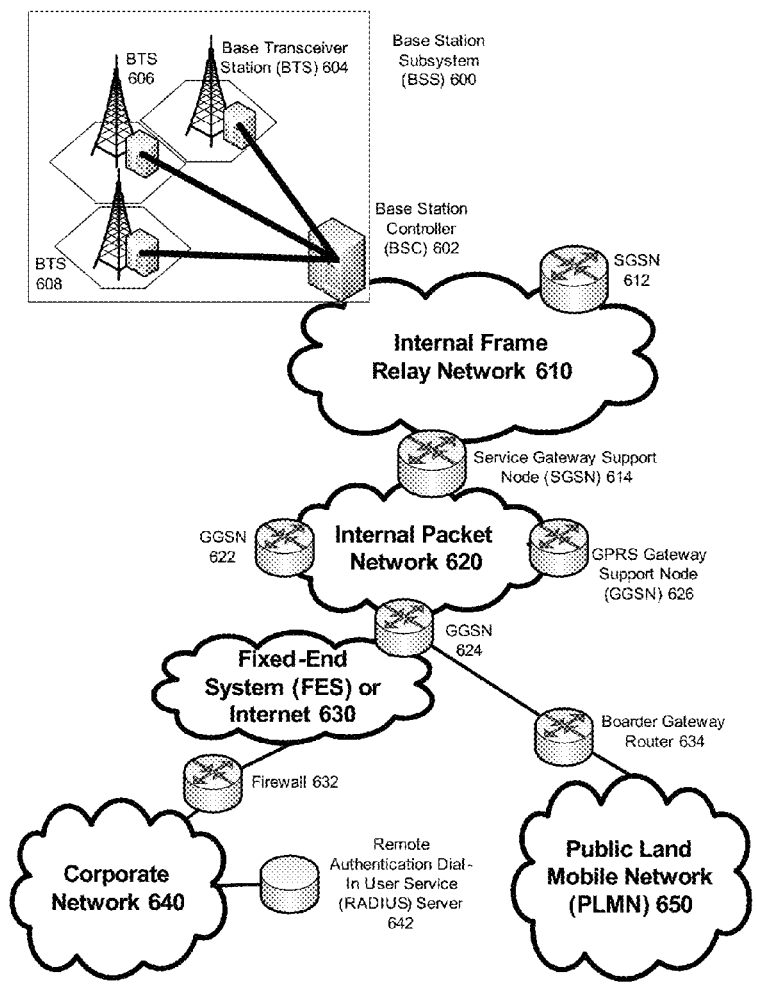
FIG. 6 depicts an overview of a network environment in which aspects of an embodiment may be implemented.

FIG. 6 depicts an overall block diagram of an exemplary packet-based mobile cellular network environment, such as a GPRS network, in which the system for implementing a configuration of the above wireless communication system 110 can be practiced. In an example configuration, the above described embodiments of the WCNS 116 are encompassed by elements of the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

FIG. 7 illustrates an architecture of a typical GPRS network as segmented into four groups: users 750, radio access network 760, core network 770, and interconnect network 780. In an example configuration the wireless communication system 110, the system is encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 could comprise the user 126 and/or the mobile device 112. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, like the above describer end user 126, and sometimes to the actual portable device, such as the above described mobile device 112, used by an end user of the mobile cellular service. Different element numbers may be used. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of the above described wireless communication system 110 and the embodiments of the WCNS 116 and/or the mobile device 112 can include but are not limited to Gateway GPRS Support Node tables, Fixed End System router tables, firewall systems, VPN tunnels, and any number of other network elements as required by the particular digital network.

Figure 8:
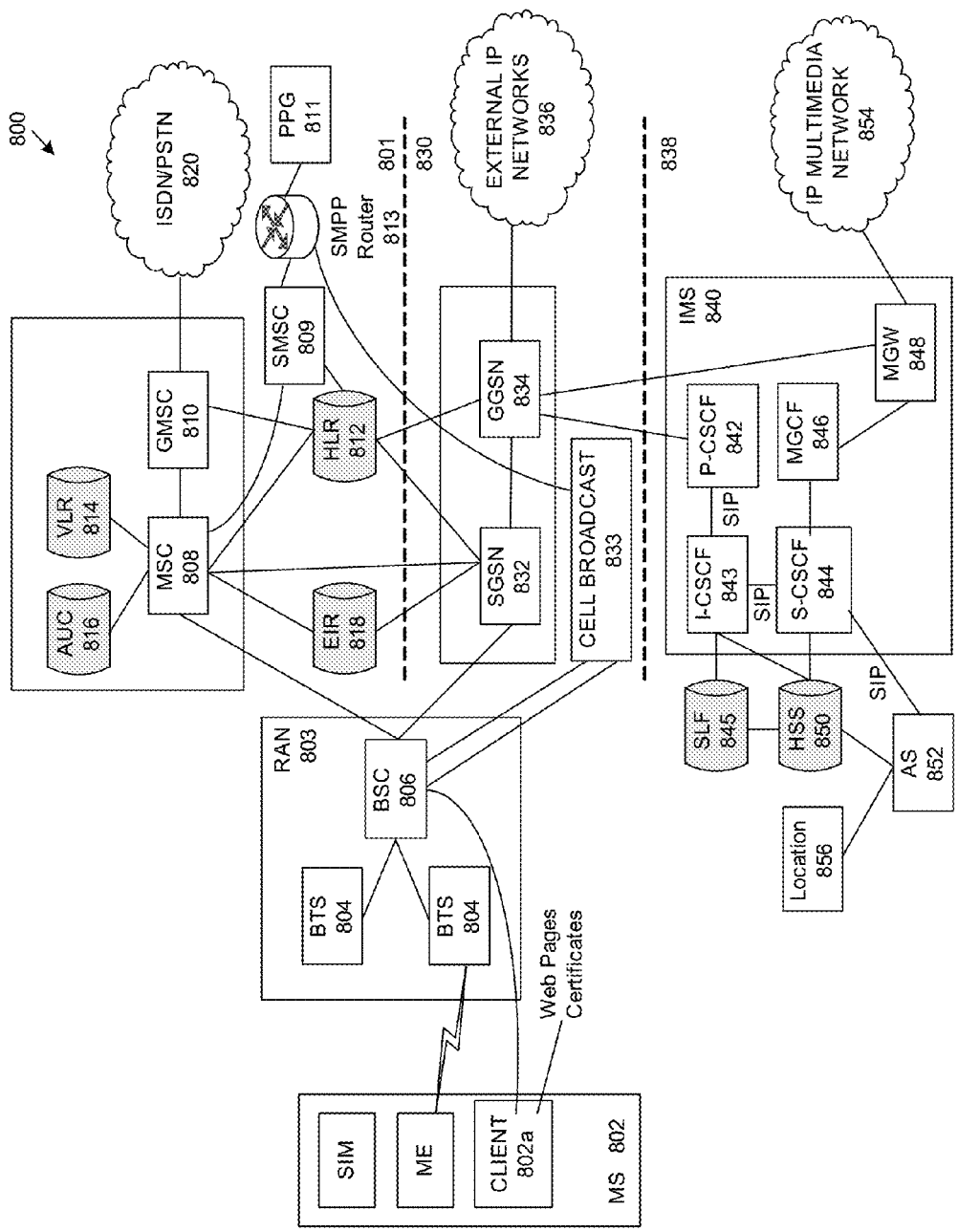
FIG. 8 depicts an alternate block diagram of an example GSM/GPRS/IP multimedia network architecture in which aspects of an embodiment may be implemented.

FIG. 8 illustrates another exemplary block diagram view of a GSM/GPRS/IP multimedia network architecture 800 in which the above described embodiments of the WCNS 116 and/or the mobile device 112 can be incorporated. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The WCNS 116 could be implemented in the BSC 806. The MS 802 is physical equipment or Mobile Equipment (ME), such as a mobile phone (such as mobile device 112) or a laptop computer that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides inter-working functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an SCSCF. The I-CSCF 843 may contact a subscriber location function (SLF) 845 to determine which HSS 850 to use for the particular subscriber, if multiple HSS's 850 are present. The SCSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides userplane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed is:

1. A network component comprising:
   a processor; and
   memory coupled to the processor, the memory comprising executable instructions that when executed by the processor cause the processor to effectuate operation comprising:
   detecting a call from a mobile device;
   detecting a first predetermined record cue corresponding to a first predetermined identifier wherein the first predetermined identifier comprises a metatag, a data id tag or an electronic subject matter identifier;
   capturing a first portion of the call upon the first predetermined record cue being detected to provide a captured portion of the call;
   associating the first predetermined identifier with the captured portion of the call, wherein:
      the first predetermined identifier identifies a first subject matter of the first portion of the call;
   converting the first portion of the call into a first captured data;
   inserting the first predetermined identifier into the first captured data;
   writing the first captured data into a first data file wherein the first data file comprises a text based transcript of the captured portion of the call or an audio file with searchable meta data of the captured portion of the call;
   detecting a first predetermined report cue;
   extracting a first reporting data corresponding to the first predetermined report cue from the first captured data;
   identifying the first reporting data with the first predetermined identifier; and
   writing the reporting data into a first report file.

2. The network component of claim 1 further comprising detecting a second record cue.

3. The network component of claim 1 further comprising:
   capturing a second portion of the call; and
   associating a second predetermined identifier with the second portion of the call.

4. The network component of claim 3 further comprising:
   converting the second portion of the call into a second captured data.

5. The network component of claim 4 further comprising detecting a second predetermined report cue.

6. The network component of claim 5 further comprising extracting a second reporting data corresponding to the second predetermined report cue.

7. The network component of claim 1, wherein the first predetermined record cue is indicative of at least one of a product order, a telephone number, an electronic business card or a destination address.

8. A method comprising:
   detecting a call from a mobile device;
   detecting a first predetermined record cue corresponding to a first predetermined identifier wherein the first predetermined identifier comprises a metatag, a data id tag or an electronic subject matter identifier;
   capturing a first portion of the call upon the first predetermined record cue being detected to provide a captured portion of the call;
   associating the first predetermined identifier with the captured portion of the call, wherein:
      the first predetermined identifier identifies a first subject matter of the first portion of the call;
   converting the first portion of the call into a first captured data;
   inserting the first predetermined identifier into the first captured data;
   detecting a first predetermined report cue;
   extracting a first reporting data corresponding to the first predetermined report cue from the first captured data;
   identifying the first reporting data with the first predetermined identifier; and
   writing the reporting data into a first report file.

9. The method of claim 8, further comprising:
   detecting a second record cue.

10. The method of claim 8, further comprising:
    capturing a second portion of the call; and
    associating a second predetermined identifier with the second portion of the call.

11. The method of claim 10, further comprising:
    converting the second portion of the call into a second captured data.

12. The method of claim 11, further comprising:
    detecting a second predetermined report cue.

13. The method of claim 12 further comprising:
    extracting a second reporting data corresponding to the second predetermined report cue.

14. The method of claim 9 wherein the first predetermined record cue is indicative of at least one of a product order, a telephone number, an electronic business card or a destination address.

15. A mobile device comprising:
    a processor; and
    memory coupled to the processor, the memory comprising executable instructions that when executed by the processor cause the processor to effectuate operations comprising:
    detecting a call
    detecting a first predetermined record cue corresponding to a first predetermined identifier wherein the first predetermined identifier comprises a metatag, a data id tag or an electronic subject matter identifier;
    capturing a first portion of the call upon the first predetermined record cue being detected to provide a captured portion of the call;
    associating the first predetermined identifier with the captured portion of the call, wherein:
       the first predetermined identifier identifies a first subject matter of the the first portion of the call;
    converting the first portion of the call into a first captured data;
    inserting the first predetermined identifier into the first captured data;
    writing the first captured data into a first data file wherein the first data file comprises a text based transcript of the captured portion of the call or an audio file with searchable meta data of the captured portion of the call;
    detecting a first predetermined report cue;
    extracting a first reporting data corresponding to the first predetermined report cue from the first captured data
    identifying the first reporting data with the first predetermined identifier; and
    writing the reporting data into a first report file.

16. The mobile device of claim 15 wherein further comprising:
    detecting a second record cue.

17. The mobile device of claim 15 further comprising:
capturing a second portion of the call; and
associating a second predetermined identifier with the second portion of the call.

18. The mobile device of claim 17 further comprising:
converting the second portion of the call into a second captured data set.

19. The mobile device of claim 18 further comprising:
detecting a second predetermined report cue.

20. The mobile device of claim 19 further comprising:
extracting a second reporting data corresponding to the second predetermined report cue.

* * * * *